US008706385B2

(12) United States Patent
Nakayama et al.

(10) Patent No.: US 8,706,385 B2
(45) Date of Patent: Apr. 22, 2014

(54) EXHAUST GAS RECIRCULATION DEVICE OF INTERNAL COMBUSTION ENGINE, AND CONTROL METHOD FOR THE DEVICE

(75) Inventors: Shigeki Nakayama, Susono (JP); Akio Matsunaga, Aichi-ken (JP); Tomomi Onishi, Susono (JP); Akiyuki Iemura, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1169 days.

(21) Appl. No.: 12/602,693

(22) PCT Filed: Jun. 6, 2008

(86) PCT No.: PCT/IB2008/001455
§ 371 (c)(1),
(2), (4) Date: Dec. 2, 2009

(87) PCT Pub. No.: WO2008/149212
PCT Pub. Date: Dec. 11, 2008

(65) Prior Publication Data
US 2010/0179745 A1 Jul. 15, 2010

(30) Foreign Application Priority Data
Jun. 8, 2007 (JP) ................................ 2007-152832

(51) Int. Cl.
*B60T 7/12* (2006.01)
*G05D 1/00* (2006.01)
*G06F 7/00* (2006.01)
*G06F 17/00* (2006.01)
*F02M 25/07* (2006.01)

(52) U.S. Cl.
USPC ...... 701/108; 701/109; 701/115; 123/568.11; 123/568.16; 60/273

(58) Field of Classification Search
USPC ........ 701/108, 109, 115; 123/568.11, 568.16, 123/698; 60/605.2, 273, 276, 278
See application file for complete search history.

(56) References Cited

U.S. PATENT DOCUMENTS

| | | | |
|---|---|---|---|
| 7,814,752 B2 * | 10/2010 | Hu | 60/605.2 |
| 2006/0213490 A1 * | 9/2006 | Vigild et al. | 123/704 |
| 2007/0079614 A1 * | 4/2007 | Barbe et al. | 60/605.2 |
| 2007/0119172 A1 * | 5/2007 | Barbe et al. | 60/605.2 |

FOREIGN PATENT DOCUMENTS

| | | |
|---|---|---|
| JP | 8-121261 | 5/1996 |
| JP | 10-141147 | 5/1998 |

(Continued)

*Primary Examiner* — Willis R Wolfe, Jr.
*Assistant Examiner* — Anthony L Bacon
(74) *Attorney, Agent, or Firm* — Finnegan, Henderson, Farabow, Garrett & Dunner, LLP

(57) ABSTRACT

An exhaust gas recirculation device of an internal combustion engine (1) including a low-pressure EGR passage (20), a high-pressure EGR passage (21), a low-pressure EGR valve (23) and a high-pressure EGR valve (24) further includes an air-fuel ratio sensor (12) that is disposed in the exhaust passage (4) upstream of the position of its connection with the low-pressure EGR passage (20). In the case where a predetermined fuel-cut condition is satisfied, an ECU (30) estimates the flow amounts of exhaust gas flowing in the low-pressure EGR passage (20) and the high-pressure EGR passage (21), on the basis of the oxygen concentrations acquired by the air-fuel ratio sensor (12) at timings at which the exhaust gases recirculated into the intake passage (3) via the low-pressure EGR passage (20) and via the high-pressure EGR passage (21) reach the air-fuel ratio sensor (12), respectively.

7 Claims, 16 Drawing Sheets

(56) References Cited

FOREIGN PATENT DOCUMENTS

| JP | 2000-130265 | 5/2000 |
| JP | 2005-76456 | 3/2005 |
| JP | 2007-255323 | 10/2007 |

* cited by examiner

F I G . 12B
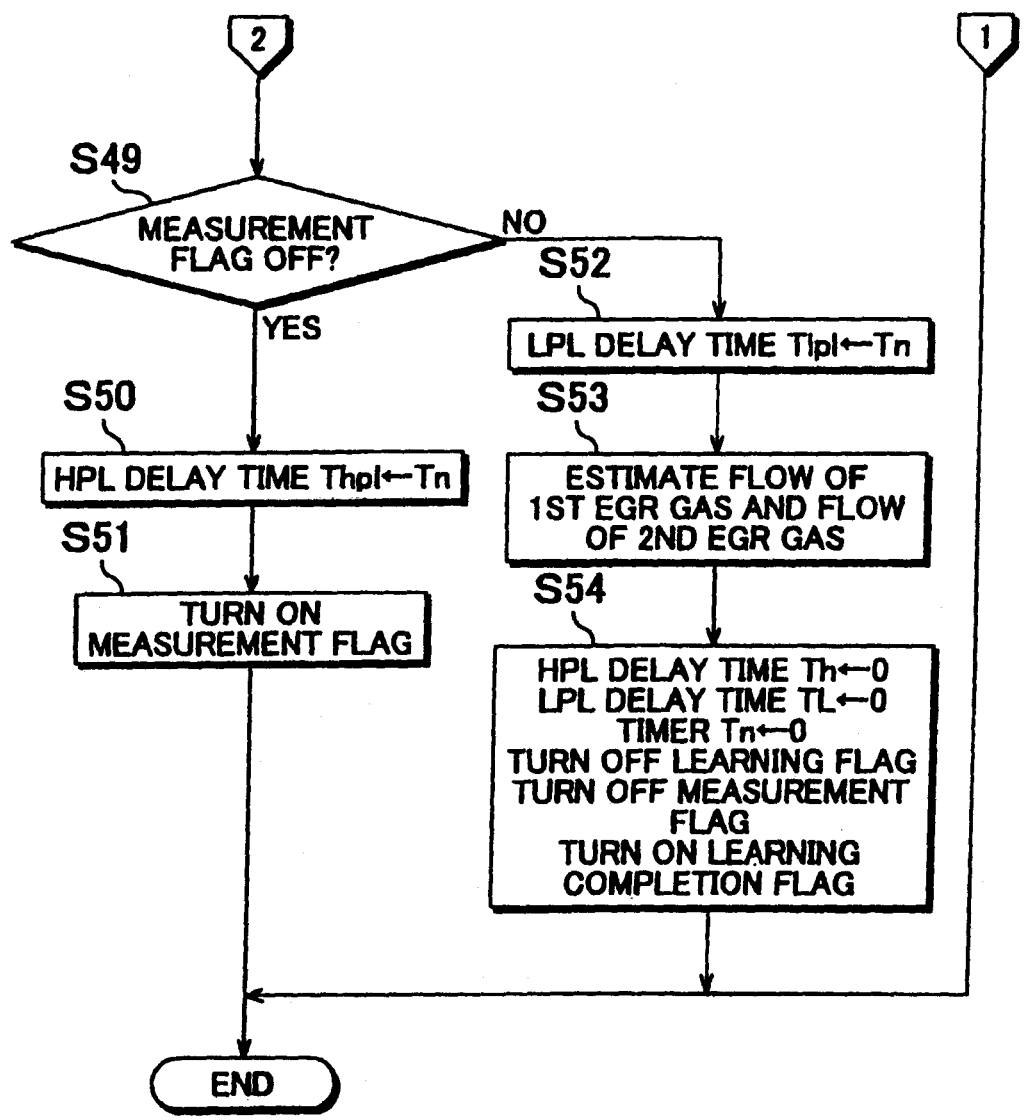

EXHAUST GAS RECIRCULATION DEVICE OF INTERNAL COMBUSTION ENGINE, AND CONTROL METHOD FOR THE DEVICE

CROSS-REFERENCE TO RELATED APPLICATIONS

This application is a national phase application of International Application No. PCT/IB2008/001455, filed Jun. 6, 2008, and claims the priority of Japanese Application No. 2007-152832, filed Jun. 8, 2007, the contents of both of which are incorporated herein by reference.

BACKGROUND OF THE INVENTION

1. Field of the Invention

The invention relates to an exhaust gas recirculation device of an internal combustion engine which includes a low-pressure EGR passage that connects an exhaust passage and an intake passage, and an high-pressure EGR passage that connects the exhaust passage upstream of the position of its connection with the low-pressure EGR passage and the intake passage downstream of the position of its connection with the low-pressure EGR passage, and a control method for the exhaust gas recirculation device.

2. Description of the Related Art

There is a known internal combustion engine which includes: a low-pressure exhaust gas recirculation passage that links an exhaust passage downstream of the turbine of a turbocharger and an intake passage upstream of the compressor of the turbocharger; a high-pressure exhaust gas recirculation passage that links the exhaust passage upstream of the turbine and the intake passage downstream of the compressor; a first recirculated exhaust gas control valve capable of controlling the amount of recirculated exhaust gas that flows in the low-pressure exhaust gas recirculation passage; and a second recirculated exhaust gas control valve capable of controlling the amount of recirculated exhaust gas that flows in the high-pressure exhaust gas recirculation passage, and in which the amount of exhaust gas that flows in the low-pressure exhaust gas recirculation passage and the amount of exhaust gas that flows in the high-pressure exhaust gas recirculation passage are controlled on the basis of the requested engine load (see Japanese Patent Application Publication No. 2005-076456 (JP-A-2005-076456)). There also is a known control device of an engine which includes a primary EGR passage and a secondary EGR passage that each connect an exhaust passage and an intake passage, and which controls EGR valves provided in the two EGR passages, respectively, so that the amount of flow of EGR gas that achieves a target EGR rate set from the engine load and the engine rotation speed is recirculated via the EGR passages (see Japanese Patent Application Publication No. 2000-130265 (JP-A-2000-130265)). Furthermore, there is a known internal combustion engine in which an exhaust passage or both the exhaust passage and an intake passage are provided with an oxygen concentration sensor or oxygen concentration sensors, and in which the amount of flow of EGR gas that is actually recirculated is found on the basis of the detected values from the one or more oxygen concentration sensors (see Japanese Patent Application Publication No. 08-121261 (JP-A-08-121261), and Japanese Patent Application Publication No. 10-141147 (JP-A-10-141147)).

The control device of Japanese Patent Application Publication No. 2000-130265 (JP-A-2000-130265) controls the degree of opening of each EGR valve on the basis of the operation state of the engine, that is, by a so-called open-loop control. As for the EGR valves, however, the correspondence relation between the degree of opening thereof and the amount of flow of gas passing therethrough changes due to time-dependent or aging changes, product variations, etc. Therefore, there is possibility of a targeted flow amount of EGR gas not being recirculated to the intake passage. In such a case, it becomes necessary to find the flow amounts of EGR gas actually recirculated to the intake passage via the EGR passages, and, on the basis of the recirculated flow amounts of the EGR gas, correct the correspondence relation between the opening degrees of the EGR valves and the passage flow amounts or correct the opening degrees of the EGR valves so that the targeted flow amount of EGR gas is recirculated. The actual EGR gas flow amount can be found on the basis of the detected values from the oxygen concentration sensors as described in Japanese Patent Application Publication No. 08-121261 (JP-A-08-121261) or Japanese Patent Application Publication No. 10-141147 (JP-A-10-141147). However, the technology described in either publication is a method applied to an internal combustion engine that has only one EGR passage, and no consideration is given to the application of the method to an internal combustion engine that has a plurality of EGR passages. If each EGR passage is provided with a sensor to detect the EGR gas flow amount, the cost increases.

SUMMARY OF THE INVENTION

The invention provides an exhaust gas recirculation device for an internal combustion engine having a plurality of EGR passages which is capable of estimating the flow amount of exhaust gas being recirculated to the intake passage via an EGR passage that is set as an estimation object while restraining the increase in cost, and a control method for the exhaust gas recirculation device.

An exhaust gas recirculation device of an internal combustion engine in accordance with a first aspect of the invention is an exhaust gas recirculation device of an internal combustion engine, the internal combustion engine including: a low-pressure EGR passage that connects an exhaust passage and an intake passage; a high-pressure EGR passage that connects the exhaust passage upstream of a position of connection of the exhaust passage with the low-pressure EGR passage and the intake passage downstream of a position of connection of the intake passage with the low-pressure EGR passage; a low-pressure EGR valve that adjusts flow amount of exhaust gas that flows in the low-pressure EGR passage; a high-pressure EGR valve that adjusts the flow amount of exhaust gas that flows in the high-pressure EGR passage; and oxygen concentration acquisition means disposed in the intake passage downstream of a position of connection of the intake passage with the high-pressure EGR passage or in the exhaust passage upstream of the position of the connection of the exhaust passage with the low-pressure EGR passage, the oxygen concentration acquisition means acquiring oxygen concentration of the gas flowing in the passage in which the oxygen concentration acquisition means is disposed, the exhaust gas recirculation device being characterized in by including an EGR gas amount estimation means for, if a predetermined EGR gas amount estimation condition is satisfied, estimating the flow amount of exhaust gas flowing in at least one of the low-pressure EGR passage and the high-pressure EGR passage that is set as at least one estimation-object EGR passage, based on the oxygen concentration acquired by the oxygen concentration acquisition means at a timing at which the exhaust gas recirculated into the intake passage via the at least one estimation-object EGR passage reaches the oxygen concentration acquisition means.

The oxygen concentration of the gas containing the exhaust gas recirculated via the EGR passage has a correlation with the flow amount of the exhaust gas recirculated via the EGR passage. Since the oxygen concentration acquisition means is disposed in the intake passage downstream of the position of its connection with the high-pressure EGR passage, the oxygen concentrations of both the gas containing the exhaust gas recirculated via the high-pressure EGR passage and the gas containing the exhaust gas recirculated via the low-pressure EGR passage can be acquired, so that the flow amounts of the exhaust gas recirculated via the EGR passages can each be estimated. In the case where the oxygen concentration acquisition means is disposed in the exhaust passage upstream of the position of its connection with the low-pressure EGR passage, the oxygen concentrations of both the gas containing the exhaust gas recirculated via the high-pressure EGR passage and the gas containing the exhaust gas recirculated via the low-pressure EGR passage can be acquired, fore example, at the time of a fuel-cut control in which supply of fuel to the internal combustion engine is stopped and the gas in the intake passage is led to the exhaust passage via cylinders, or the like. Therefore, the flow amounts of the exhaust gases recirculated via the EGR passages can each be estimated. Thus, according to the first aspect of the invention, it is possible to acquire the oxygen concentration of a gas containing the exhaust gas recirculated via an estimation-object EGR passage while restraining the number of oxygen concentration acquisition means to be provided. Therefore, it is possible to estimate the flow amount of the exhaust gas recirculated into the intake passage via the EGR passage while restraining increases in cost.

In the first aspect of the invention, the exhaust gas recirculation device may further include: storage means for storing a correspondence relation between the flow amount of the exhaust gas recirculated into the intake passage via the estimation-object EGR passage and opening degree of an EGR valve that is provided in the estimation-object EGR passage; and learning means for amending the correspondence relation stored in the storage means based on a difference between the flow amount of exhaust gas estimated by the EGR gas amount estimation means and a target flow amount of exhaust gas that is to be recirculated via the estimation-object EGR passage when the predetermined EGR gas amount estimation condition is satisfied. In this case, since the correspondence relation between the degree of opening of the EGR valve and the flow amount of exhaust gas is corrected on the basis of the flow amount of exhaust gas estimated by the EGR gas amount estimation means, the target flow amount of exhaust gas can be recirculated into the intake passage via the estimation-object EGR passage even if the EGR valve has a time-dependent or aging change or a product variation.

In the first aspect of the invention: the internal combustion engine may further include a first throttle valve that is provided in the intake passage upstream of the position of the connection with the low-pressure EGR passage and that is capable of adjusting an intake amount, and a second throttle valve that is provided in the intake passage downstream of the position of the connection with the low-pressure EGR passage and upstream of the position of the connection with the high-pressure EGR passage and that is capable of adjusting the intake amount; the internal combustion engine may be an object of application of a fuel-cut control in which supply of fuel to the internal combustion engine is stopped if a predetermined fuel-cut condition is satisfied; the predetermined EGR gas amount estimation condition may be the predetermined fuel-cut condition; the low-pressure EGR passage and the high-pressure EGR passage may be set as the estimation-object EGR passage; the oxygen concentration acquisition means may be disposed in the exhaust passage upstream of the position of the connection with the low-pressure EGR passage; the EGR gas amount estimation means, if the predetermined EGR gas amount estimation condition is satisfied, may firstly fully close the low-pressure EGR valve and the high-pressure EGR valve, and may fully open the first throttle valve and the second throttle valve, and then may retain, as a first oxygen concentration, the oxygen concentration that is acquired by the oxygen concentration acquisition means at a time point at which a gas existing in the intake passage downstream of the position of the connection with the high-pressure EGR passage when the predetermined EGR gas amount estimation condition is satisfied reaches the oxygen concentration acquisition means, and may retain, as a second oxygen concentration, the oxygen concentration that is acquired by the oxygen concentration acquisition means at a time point at which a gas existing in the intake passage upstream of the position of the connection with the high-pressure EGR passage and downstream of the position of the connection with the low-pressure EGR passage when the predetermined EGR gas amount estimation condition is satisfied reaches the oxygen concentration acquisition means, and may estimate the flow amount of exhaust gas recirculated via the low-pressure EGR passage and the flow amount of exhaust gas recirculated via the high-pressure EGR passage when the predetermined EGR gas amount estimation condition is satisfied, based on the first oxygen concentration and the second oxygen concentration.

During the fuel-cut, combustion is not performed in the cylinders of the internal combustion engine, so that by fully closing the EGR valves, the gas in the intake passage can be directly led into the exhaust gas passage. Therefore, the oxygen concentration of the gas in the intake passage at the time point at which the fuel-cut is started can be acquired by the oxygen concentration acquisition means that is provided in the exhaust passage. The oxygen concentration in the intake passage differs among three portions of the intake passage, that is, a portion thereof upstream of the position of its connection with the low-pressure EGR passage (hereinafter, sometimes referred to as the upstream portion); and a portion thereof downstream of the position of its connection with the low-pressure EGR passage and upstream of the position of its connection with the high-pressure EGR passage (hereinafter, sometimes referred to as the intermediate portion); and a portion thereof downstream of the position of its connection with the high-pressure EGR passage (hereinafter, sometimes referred to as the downstream portion). Since the upstream portion is upstream of the position of recirculation of exhaust gas, the oxygen concentration in the upstream portion is the same as the oxygen concentration of air. In the intermediate portion, since air is mixed with the exhaust gas recirculated via the low-pressure EGR passage, the oxygen concentration becomes lower than that in the upstream portion. In the downstream portion, since the gas from the intermediate portion is further mixed with the exhaust gas recirculated via the high-pressure EGR passage, the oxygen concentration further declines. Thus, the oxygen concentration changes in the upstream portion, the intermediate portion and the downstream portion, the changes in the oxygen concentration have correlations with the amounts of exhaust gases recirculated into the three portions and the oxygen concentrations in the exhaust gases. The oxygen concentration of exhaust gas can be acquired by the oxygen concentration acquisition means when the predetermined EGR gas amount estimation condition is satisfied. Besides, during the fuel-cut, the gas in the intake passage is directly discharged into the exhaust passage, so that the oxygen concentrations in the upstream portion, the intermediate portion and the downstream portion of the intake passage can be acquired by the oxygen concentration acquisition means of the exhaust passage. Therefore, the flow amount of exhaust gas recirculated via the low-pressure EGR passage and the flow amount of exhaust gas recirculated via the high-pressure EGR passage when the EGR gas amount estimation condition is satisfied can each be estimated on the basis of the acquired oxygen concentrations.

Furthermore, in the foregoing exhaust gas recirculation device, the EGR gas amount estimation means may fully close the second throttle valve at a time point at which the gas existing in the intake passage downstream of the position of the connection with the high-pressure EGR passage when the predetermined EGR gas amount estimation condition is satisfied reaches the oxygen concentration acquisition means, and may fully open the second throttle valve after the first oxygen concentration is acquired. By fully closing the second throttle valve, the amount of gas taken into the cylinders of the internal combustion engine can be restricted, so that the amount of gas discharged from the cylinders into the exhaust passage can be restricted. Therefore, by fully closing the second throttle valve at the timing as described above, it is possible to lengthen the duration during which the gas existing in the downstream portion of the intake passage when the EGR gas amount estimation condition is satisfied resides around the oxygen concentration acquisition means. Hence, the oxygen concentration of the gas existing in the downstream portion of the intake passage can be more reliably acquired.

Besides, in the exhaust gas recirculation device, the oxygen concentration acquisition means may be disposed in the exhaust passage upstream of the position of the connection with the high-pressure EGR passage, and the EGR gas amount estimation means may fully close the second throttle valve and may fully open the high-pressure EGR valve at a time point at which the gas existing in the intake passage upstream of the position of the connection with the high-pressure EGR passage and downstream of the position of the connection with the low-pressure EGR passage when the EGR gas amount estimation condition is satisfied reaches the oxygen concentration acquisition means, and then may fully open the second throttle valve and may fully close the high-pressure EGR valve after the second oxygen concentration is acquired. By fully closing the second throttle valve and fully opening the high-pressure EGR valve, the gas discharged from the cylinders can be recirculated into the downstream portion of the intake passage via the high-pressure EGR passage, and therefore can be taken into the cylinders again. That is, gas can be circulated via the high-pressure EGR passage. Therefore, by fully closing the second throttle valve and fully opening the high-pressure EGR valve at the timing as described above, the gas existing in the intermediate portion of the intake passage when the predetermined EGR gas amount estimation condition is satisfied can be circulated. Since the oxygen concentration acquisition means is disposed in the exhaust passage upstream of the position of its connection with the high-pressure EGR passage, the oxygen concentration of circulated gas can be acquired by the oxygen concentration acquisition means. Therefore, the oxygen concentration of the gas existing in the intermediate portion of the intake passage can be reliably acquired. Besides, since excessive decline in the pressure in the cylinders can be restrained by circulating gas, the oil climb in which oil enters the combustion chambers through the gaps between the pistons and the cylinders can be restrained.

In the first aspect of the invention: the low-pressure EGR passage may be set as the estimation-object EGR passage; the oxygen concentration acquisition means may be disposed in the intake passage downstream of the position of the connection with the high-pressure EGR passage; it may be determined that the EGR gas amount estimation condition is satisfied when an amount of change in amount of fuel supplied to the internal combustion engine, if the amount of fuel changes, is greater than or equal to a pre-set predetermined amount; and if the predetermined EGR gas amount estimation condition is satisfied, the EGR gas amount estimation means may acquire, as a high-pressure EGR gas recirculation duration, a period from the time of satisfaction of the predetermined EGR gas amount estimation condition till a time at which the amount of change in the oxygen concentration acquired by the oxygen concentration acquisition means subsequently to the satisfaction of the predetermined EGR gas amount estimation condition, if the oxygen concentration changes, first exceeds a pre-set criterion value, on a condition that opening degree of the high-pressure EGR valve and the opening degree of the low-pressure EGR valve be maintained, and may acquire, as a low-pressure EGR gas recirculation duration, a period from the time of satisfaction of the predetermined EGR gas amount estimation condition till a time at which the amount of change in the oxygen concentration acquired by the oxygen concentration acquisition means subsequently to the satisfaction of the predetermined EGR gas amount estimation, if the oxygen concentration changes, exceeds the criterion value for a second time, and then may estimate the flow amount of exhaust gas that is recirculated via the low-pressure EGR passage based on the high-pressure EGR gas recirculation duration and the low-pressure EGR gas recirculation duration. Since the high-pressure EGR passage and the low-pressure EGR passage are different from each other in the positions of connection with the intake passage and the exhaust passage, the timing at which influence of a change in the amount of fuel supplied to the internal combustion engine appears on the oxygen concentration in the intermediate portion of the intake passage is different from the timing at which influence of the change appears on the oxygen concentration in the downstream portion of the intake passage. Besides, the timing at which the influence of the change in the supplied amount of fuel appears on the oxygen concentration in various portions varies depending on the EGR gas flow amounts of the EGR passages as well. For example, in the case where the EGR gas flow amount in the low-pressure EGR passage is large, the timing at which the oxygen concentration in the intermediate portion of the intake passage becomes earlier than in the case where the EGR gas flow amount in the low-pressure EGR passage is small. In this form, the oxygen concentration acquisition means is disposed in the intake passage downstream of the position of its connection with the high-pressure EGR passage. Therefore, in the case where the supplied amount of fuel changes and therefore the oxygen concentration in exhaust gas changes, the change in the oxygen concentration in the downstream portion of the intake passage can be acquired by the oxygen concentration acquisition means, and then the change in the oxygen concentration in the intermediate portion of the intake passage can be acquired by the oxygen concentration acquisition means. As described above, the timing at which these changes appear has a correlation with the EGR gas flow amounts in the EGR passages. Therefore, on the basis of the timing of appearance of these changes, the EGR gas flow amounts flowing in the EGR passages can be estimated.

Furthermore, in the exhaust gas recirculation device, the EGR gas amount estimation means may stop estimating the flow amount of exhaust gas recirculated via the low-pressure EGR passage if the amount of fuel supplied to the internal combustion engine fluctuates beyond a pre-set permissible range during a period from the satisfaction of the EGR gas amount estimation condition until the low-pressure EGR gas recirculation duration is acquired. Thus, if the amount of fuel changes while the EGR gas recirculation durations are being acquired, the influence of the change in the amount of fuel appears on the oxygen concentrations in the aforementioned portions of the intake passage, so that incorrect EGR gas recirculation durations are acquired. In that case, therefore, the estimation of the flow amount of exhaust gas is stopped. This will restrain the estimation of an incorrect flow amount of exhaust gas.

As described above, according to the first aspect of the invention, the oxygen concentrations in various portions of the intake passage can be acquired by the oxygen concentration acquisition means provided in the intake passage or the exhaust passage. Therefore, the number of oxygen concentration acquisition means needed in order to estimate the flow amount of exhaust gas can be curbed, so that the increase in cost can be restrained. Besides, since the oxygen concentrations in the various portions of the intake passage are affected by the flow amounts of exhaust gas recirculated via the EGR passages, the flow amount of exhaust gas recirculated into the intake passage via the EGR passage can be estimated on the basis of the oxygen concentrations acquired by the oxygen concentration acquisition means.

A second aspect of the invention is an exhaust gas recirculation method of an internal combustion engine, the internal combustion engine including: a low-pressure EGR passage that connects an exhaust passage and an intake passage; a high-pressure EGR passage that connects the exhaust passage upstream of a position of connection of the exhaust passage with the low-pressure EGR passage and the intake passage downstream of a position of connection of the intake passage with the low-pressure EGR passage; a low-pressure EGR valve that adjusts flow amount of exhaust gas that flows in the low-pressure EGR passage; a high-pressure EGR valve that adjusts the flow amount of exhaust gas that flows in the high-pressure EGR passage; and oxygen concentration acquisition means disposed in the intake passage downstream of a position of connection of the intake passage with the high-pressure EGR passage or in the exhaust passage upstream of the position of the connection of the exhaust passage with the low-pressure EGR passage, the oxygen concentration acquisition means acquiring oxygen concentration of the gas flowing in the passage in which the oxygen concentration acquisition means is disposed, the exhaust gas recirculation method being characterized in by including estimating, if a predetermined EGR gas amount estimation condition is satisfied, the flow amount of exhaust gas flowing in at least one of the low-pressure EGR passage and the high-pressure EGR passage that is set as at least one estimation-object EGR passage, based on the oxygen concentration acquired by the oxygen concentration acquisition means at a timing at which the exhaust gas recirculated into the intake passage via the at least one estimation-object EGR passage reaches the oxygen concentration acquisition means.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 12A and 12B are a flowchart showing an EGR gas amount-estimating routine in accordance with the third embodiment;

DETAILED DESCRIPTION OF EMBODIMENTS

First Embodiment

Figure 1:
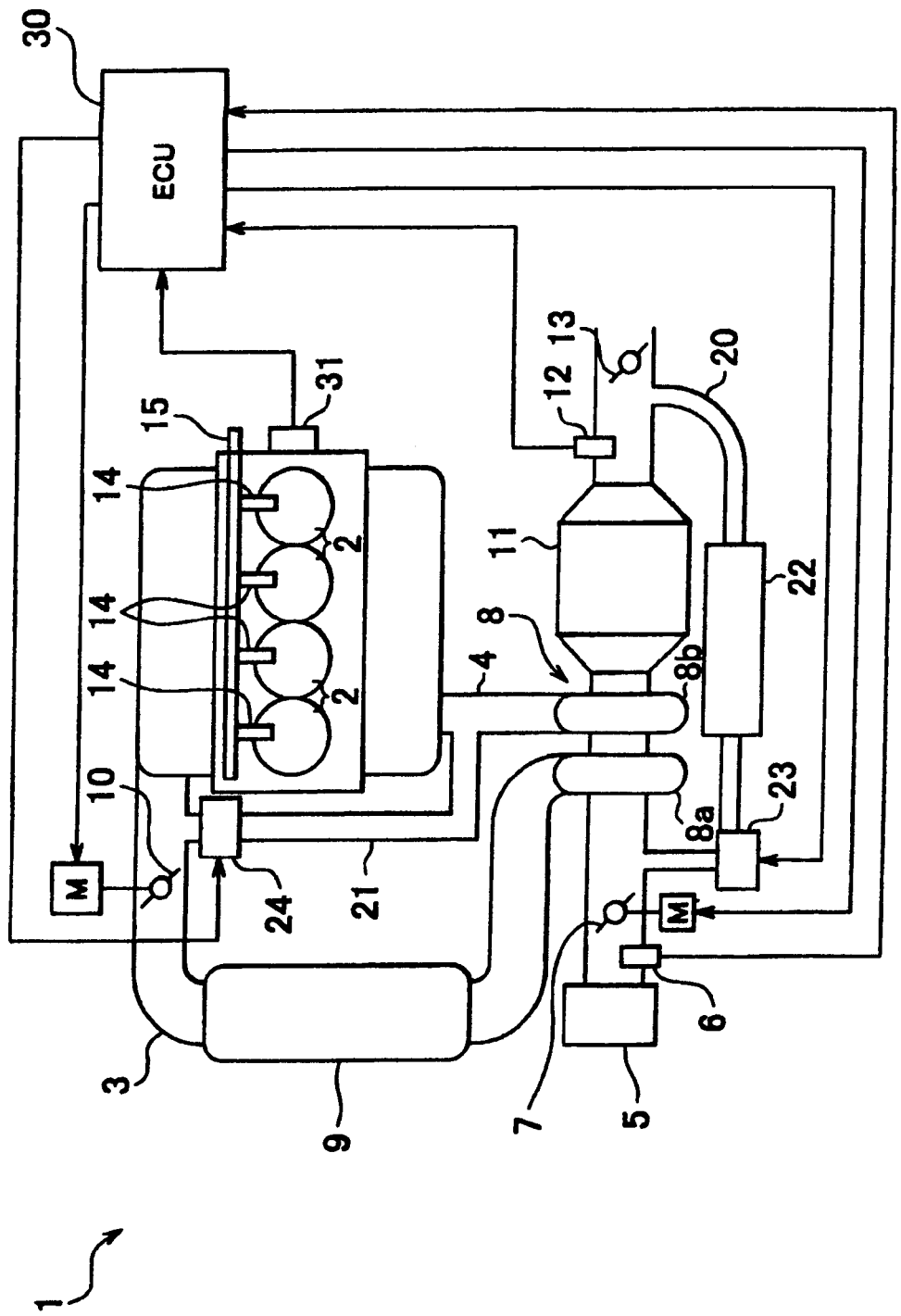
FIG. 1 is a diagram showing an internal combustion engine in which an exhaust gas recirculation device in accordance with a first embodiment of the invention is incorporated.

FIG. 1 shows an example of an internal combustion engine in which an exhaust gas recirculation device in accordance with a first embodiment of the invention is incorporated. The internal combustion engine (hereinafter, sometimes referred to as the engine) 1 shown in FIG. 1 is a diesel engine that is mounted in a vehicle as a traveling motive power source, and has a plurality of cylinders 2 (four cylinders in FIG. 1), and an intake passage 3 and an exhaust passage 4 that are connected to the cylinders 2. The intake passage 3 is provided with an air filter 5 for filtering intake air, an air flow meter 6 that outputs a signal corresponding to the amount of intake air, a first throttle valve 7 for adjusting the intake air amount, a compressor 8a of a turbocharger 8, an intercooler 9 for cooling intake gas, and a second throttle valve 10 for adjusting the intake gas amount. The exhaust passage 4 is provided with a turbine 8b of the turbocharger 8, an exhaust purification catalyst 11 for purifying exhaust gas, an air-fuel ratio sensor 12 as an oxygen concentration acquisition means that outputs a signal corresponding to the air-fuel ratio of the gas that flows in the exhaust passage 4, and an exhaust throttle valve 13 for adjusting the flow amount of exhaust gas.

Besides, each cylinder 2 is provided with an injector 14 for injecting fuel into the cylinder 2 as shown in FIG. 1. The injectors 14 are connected to a common rail 15 in which high-pressure fuel to be supplied to the injectors 14 is stored.

The exhaust passage 4 and the intake passage 3 are interconnected by a low-pressure EGR passage 20 and a high-pressure EGR passage 21. As shown in FIG. 1, the low-pressure EGR passage 20 connects the exhaust passage 4 downstream of the exhaust purification catalyst 11 and the intake passage 3 upstream of the compressor 8a. On the other hand, the high-pressure EGR passage 21 connects the exhaust passage 4 upstream of the turbine 8b and the intake passage 3 downstream of the compressor 8a. The low-pressure EGR passage 20 is provided with a low-pressure EGR valve 23 for adjusting the flow amount of the exhaust gas led to the intake passage 3, that is, the EGR gas recirculated to the intake passage 3 via the low-pressure EGR passage 20, and an EGR cooler 22 for cooling the EGR gas (hereinafter, sometimes referred to as the first EGR gas). The high-pressure EGR passage 21 is provided with a high-pressure EGR valve 24 for adjusting the flow amount of the EGR gas recirculated to the intake passage 3 via the high-pressure EGR passage 21 (hereinafter, sometimes referred to as the second EGR gas).

The operations of the first throttle valve 7, the second throttle valve 10, the low-pressure EGR valve 23 and the high-pressure EGR valve 24 are controlled by an electronic control unit (ECU) 30. The ECU 30 is a well-known computer unit which is constructed as a computer that includes a microprocessor and peripheral devices needed for the operation of the microprocessor, such as a RAM, a ROM, etc., and which controls the operation state of the engine 1 on the basis of the output signals of various sensors provided for the engine 1. The ECU 30, for example, calculates an amount of fuel to be injected from each injector 14 according to the rotation speed and the load of the engine 1, and controls the operation of each injector 14 so that the calculated amount of fuel is supplied into each cylinder 2. Besides, the ECU 30 controls the operation of each injector 14 so as to perform a so-called fuel-cut in which the supply of fuel to a cylinder is stopped in the case where a predetermined fuel-cut condition, for example, a condition that the rotation speed of the engine 1 be higher than a predetermined criterion value during deceleration of the engine 1, is satisfied. Sensors that are referred to for such controls are connected to the ECU 30, for example, a crank angle sensor 31 that outputs a signal corresponding to the crank angle, the air flow meter 6, the air-fuel ratio sensor 12, etc.

The ECU 30 controls the operations of both the low-pressure EGR valve 23 and the high-pressure EGR valve 24, by different control methods. The high-pressure EGR valve 24 is feedback controlled so that the oxygen concentration in the intake gas sucked into the cylinders 2 reaches a target value that is set according to the operation state of the engine 1. On the other hand, the low-pressure EGR valve 23 is controlled to a target degree of opening that is set on the basis of the operation state of the engine 1, such as the rotation speed and the load of the engine 1, etc. That is, the low-pressure EGR valve 23 is controlled in an open-loop control manner. The flow amount of EGR gas recirculated to the intake passage 3 via the low-pressure EGR passage 20 changes with the pressure loss of the exhaust purification catalyst 11 and the opening degree of the exhaust throttle valve 13. Besides, since the valve provided as the low-pressure EGR valve 23 is subject to individual product differences, such as variations in the effective opening area, and the like, there is possibility of the same target opening degree resulting in different flow amounts of recirculation of EGR gas. Therefore, it is necessary to acquire the opening degrees of the EGR valves 23, 24 and the EGR gas flow amounts in the EGR passage 20, 21 at the opening degrees of the valves, and correct the correspondence relation between the opening degree of each EGR valve 23, 24 and the flow amount of gas passing through the EGR passages. In this case, it is firstly necessary to acquire the EGR gas flow amounts in the EGR passages 20, 21.

Figure 2:
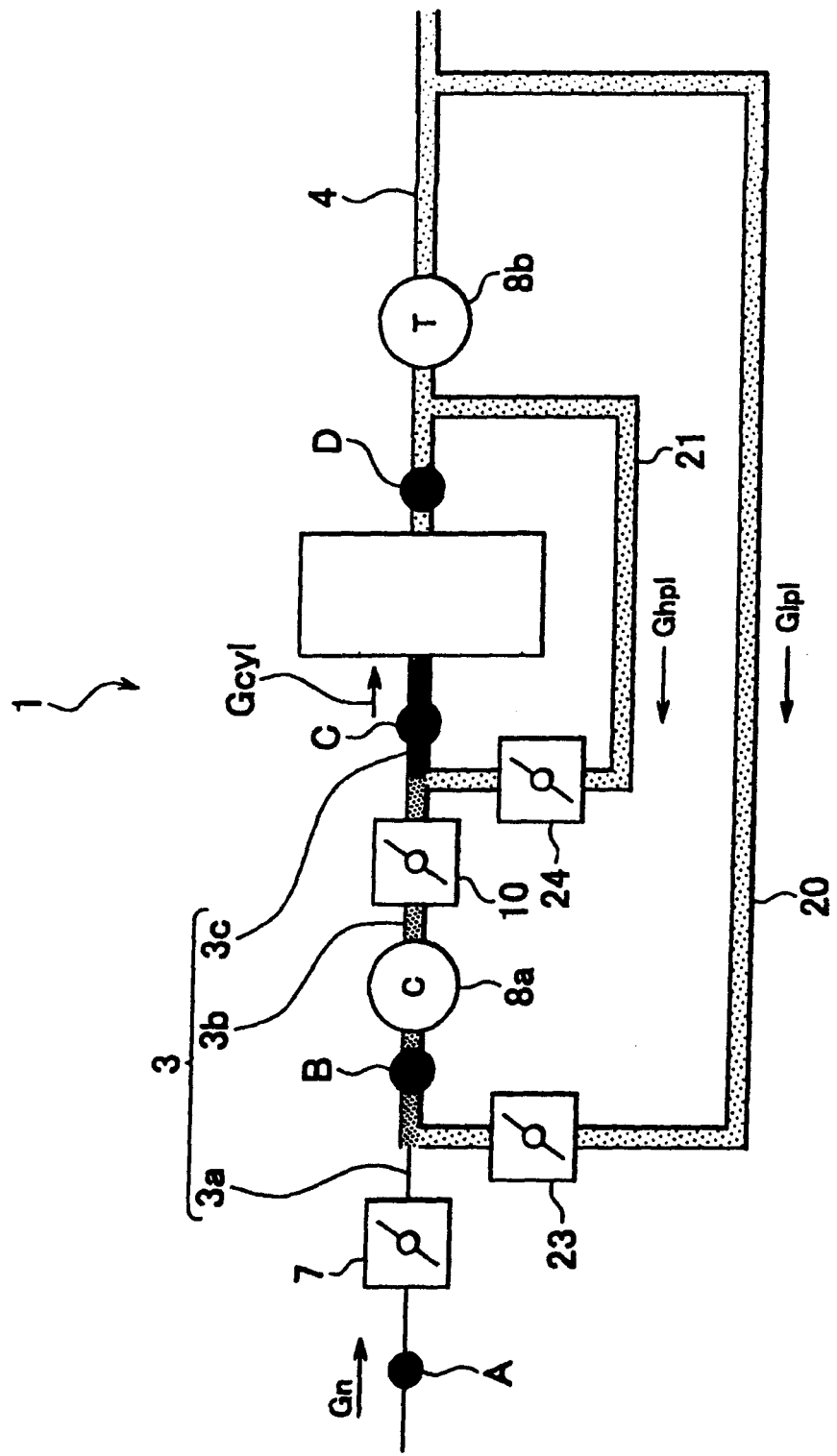
FIG. 2 is a diagram for describing flows of gas in various portions of the engine shown in FIG. 1.

With reference to FIG. 2, a method of estimating the flow amount of the first EGR gas and the flow amount of the second EGR gas in the first embodiment will be described. FIG. 2 is a diagram for describing flows of gas in various portions of the engine 1 shown in FIG. 1, and portions common between FIG. 2 and FIG. 1 are presented with the same reference characters. Incidentally, in FIG. 2, the compressor 8a and the turbine 8b of the turbocharger 8 are shown separated for the sake of convenience in illustration.

The flow amount Glpl of the first EGR gas and the flow amount Ghpl of the second EGR gas can be estimated from the carbon dioxide ($CO_2$) concentrations at points A to D shown in FIG. 2, and the flow amount Gn of air that is newly taken from the outside (hereinafter, sometimes referred to as fresh air). As shown in FIG. 2, the point A is set in the intake passage upstream of the position of its connection with the low-pressure EGR passage 20 (hereinafter, sometimes referred to as the upstream intake passage portion 3a); the point B is set in the intake passage downstream of the position of its connection with the low-pressure EGR passage 20 and upstream of the position of its connection with the high-pressure EGR passage 21 (hereinafter, sometimes referred to as intermediate intake passage portion 3b); the point C is set in the intake passage downstream of the position of its connection with the high-pressure EGR passage 21 (hereinafter, sometimes referred to as the downstream intake passage portion 3c); and the point D is set in the exhaust passage 4. Besides, the following equations (1) to (4) define the total EGR rate Regr that is the proportion of the EGR gas in the gross intake amount Gcyl taken into the cylinders 2 of the engine 1, the LPL EGR rate Regrl that is the proportion of the first EGR gas in the gross intake amount Gcyl, the HPL EGR rate Regrh that is the proportion of the second EGR gas in the gross intake amount Gcyl, and the gross intake amount Gcyl.

[Mathematical Expression 1]

$$\text{Re } gr = \frac{Glpl + Ghpl}{Gcyl} \quad (1)$$

[Mathematical Expression 2]

$$\text{Re } grl = \frac{Glpl}{Gcyl} \quad (2)$$

[Mathematical Expression 3]

$$\text{Re } grh = \frac{Ghlp}{Gcyl} \quad (3)$$

[Mathematical Expression 4]

$$Gcyl = \frac{Gn}{1 - \text{Re } gr} = Gn + Glpl + Ghpl \quad (4)$$

Incidentally, since the gas that flows through the point C in FIG. 2 is a mixture of fresh air, the first EGR gas and the second EGR gas, the $CO_2$ concentration CO2NLH at the point C can be calculated from the flow amount Gn of fresh air, the flow amount Glpl of the first EGR gas, the flow amount Ghpl of the second EGR gas, the $CO_2$ concentration CO2N in fresh air, and the $CO_2$ concentrations in the first and second EGR gases, that is, the $CO_2$ concentration CO2EH in exhaust gas, as shown in the equation (5).

[Mathematical Expression 5]

$$CO2NLH = \frac{Gn \cdot CO2N + Glpl \cdot CO2EH + Ghpl \cdot CO2EH}{Gn + Glpl + Ghpl} \quad (5)$$

From the equation (5), the following equation (6) can be derived by changing the equation (5), and representing the sum of the flow amount Glpl of the first EGR gas and the flow amount Ghpl of the second EGR gas with the subtraction of the flow amount Gn of fresh air from the gross intake amount Gcyl on the basis of the equation (4). Thus, the gross intake amount Gcyl can be calculated from the flow amount Gn of fresh air, the $CO_2$ concentration CO2N in fresh air, the $CO_2$ concentration CO2EH in exhaust gas, and the $CO_2$ concentration CO2NLH in the gas at the point C.

[Mathematical Expression 6]

$$Gcyl = \frac{CO2EH - CO2N}{CO2EH - CO2NLH} \cdot Gn \quad (6)$$

Furthermore, since a mixture gas of fresh air and the first EGR gas flows through the point B in FIG. 2, the $CO_2$ concentration CO2NL at the point B can be calculated from the flow amount Gn of fresh air, the flow amount Glpl of the first EGR gas, the $CO_2$ concentration CO2N in fresh air, the $CO_2$ concentration in the first EGR gas, that is, the $CO_2$ concentration CO2EH in exhaust gas, as shown in the following equation (7).

[Mathematical Expression 7]

$$CO2NL = \frac{Gn \cdot CO2N + Glpl \cdot CO2EH}{Gn + Glpl}$$

By changing the equation (7), the flow amount Glpl of the first EGR gas can be expressed as in the following equation (8).

[Mathematical Expression 8]

$$Glpl = \frac{CO2NL - CO2N}{CO2EH - CO2NL} \cdot Gn \quad (8)$$

Since the gross intake amount Gcyl is the sum of the flow amount Gn of fresh air, the flow amount Glpl of the first EGR gas and the flow amount Ghpl of the second EGR gas as defined in the equation (4), the flow amount Ghpl of the second EGR gas can be calculated as in the following equation (9).

[Mathematical Expression 9]

$$Ghpl = Gcyl - Glpl - Gn \quad (9)$$

Then, by substituting the equation (6) and the equation (8) in the equation (9), the following equation (10) is obtained, in which the flow amount Ghpl of the second EGR gas can be calculated from the flow amount Gn of fresh air, the $CO_2$ concentration CO2N in fresh air, the $CO_2$ concentration CO2EH in exhaust gas, and the $CO_2$ concentration CO2NL in the gas at the point B, and the $CO_2$ concentration CO2NLH in the gas at the point C.

[Mathematical Expression 10]

$$Ghpl = \left( \frac{CO2EH - CO2N}{CO2EH - CO2NLH} - \frac{CO2NL - CO2N}{CO2EH - CO2NL} - 1 \right) \cdot Gn \quad (10)$$

As described above, the flow amount Glpl of the first EGR gas and the flow amount Ghpl of the second EGR gas can each be calculated from the flow amount Gn of fresh air, the $CO_2$ concentration CO2N in fresh air, the $CO_2$ concentration CO2EH in exhaust gas, the $CO_2$ concentration CO2NL in the gas in the intermediate intake passage portion 3b, and the $CO_2$ concentration CO2NLH in the gas in the downstream intake passage portion 3c. The flow amount Gn of fresh air can be detected by the air flow meter 6. Since the fresh air is air, the $CO_2$ concentration CO2N in fresh air is the $CO_2$ concentration in air. Therefore, the flow amount Glpl of the first EGR gas and the flow amount Ghpl of the second EGR gas can be calculated by acquiring the $CO_2$ concentration CO2EH in exhaust gas, the $CO_2$ concentration CO2NL in the gas in the intermediate intake passage portion 3b, and the $CO_2$ concentration CO2NLH in the gas in the downstream intake passage portion 3c.

Figure 3A:
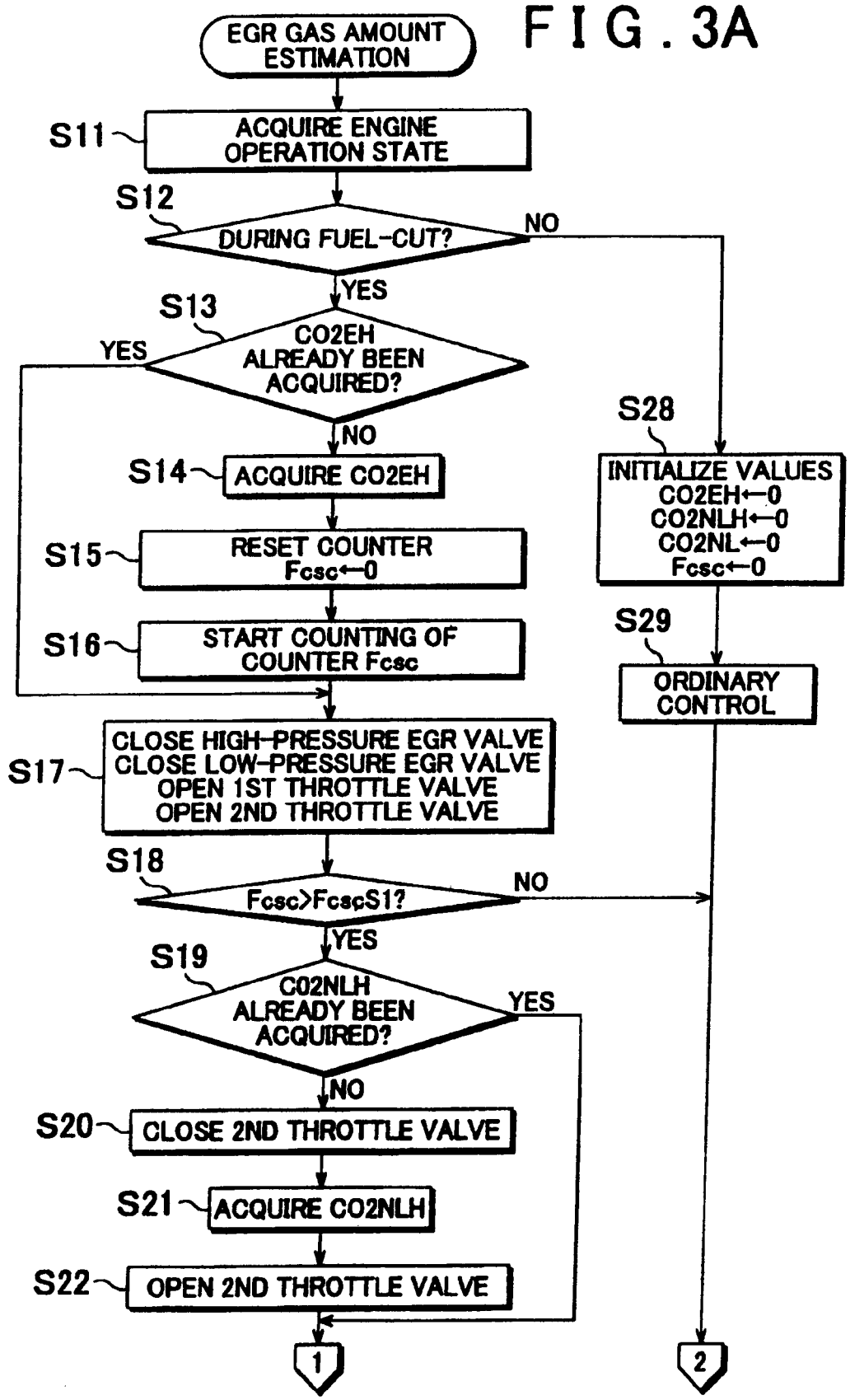
FIGS. 3A and 3B are a flowchart showing an EGR gas amount-estimating routine in accordance with the first embodiment.
Figure 3B:
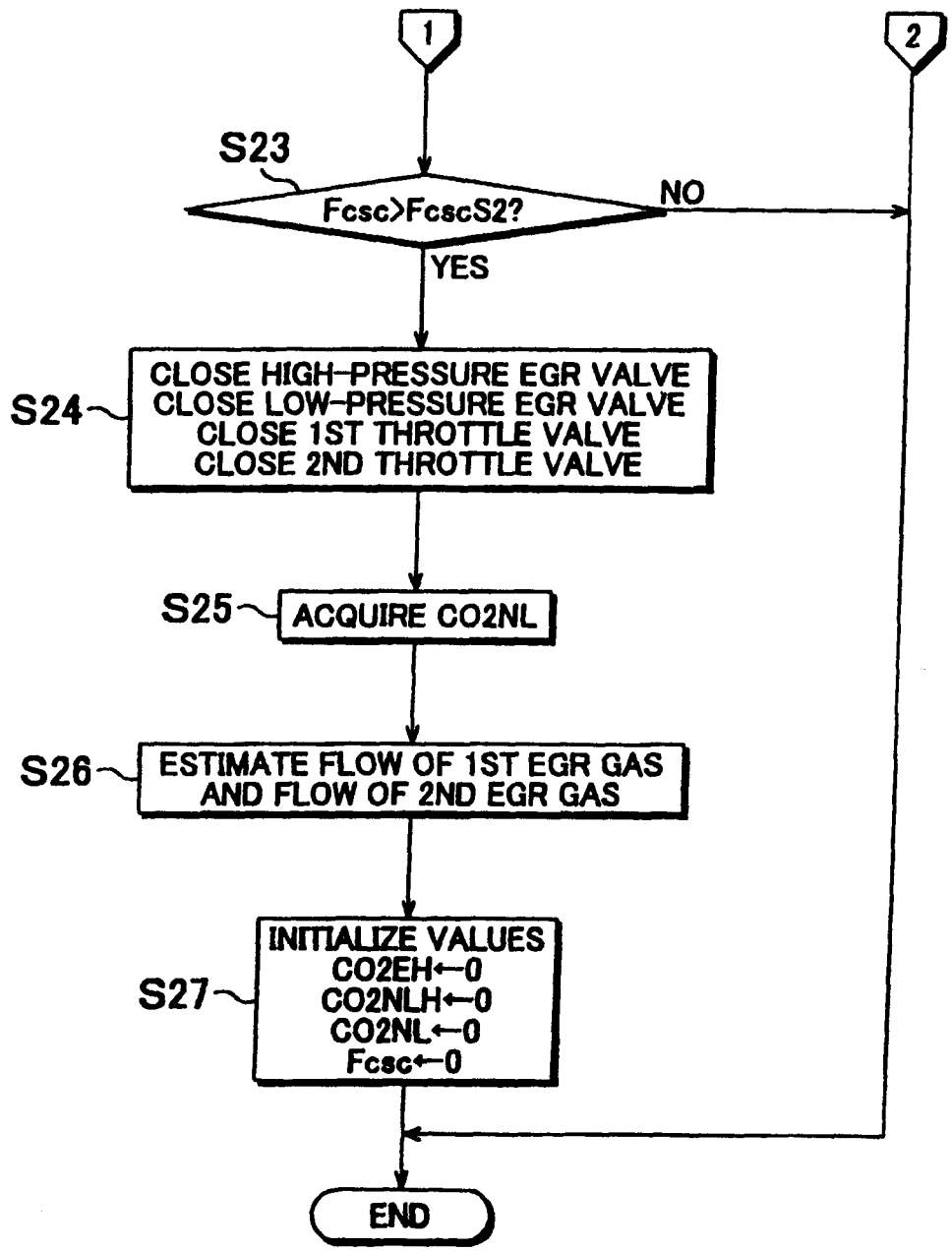

Therefore, in order to estimate the flow amount Glpl of the first EGR gas and the flow amount Ghpl of the second EGR gas by acquiring the $CO_2$ concentrations in the intermediate intake passage portion 3b, the downstream intake passage portion 3c and the exhaust passage 4, the ECU 30 executes an EGR gas amount-estimating routine shown in FIGS. 3A and 3B. This routine is repeatedly executed at every predetermined cycle period during operation of the engine 1. Incidentally, FIG. 3B is a flowchart continuing from FIG. 3A. Executing this routine, the ECU 30 functions as EGR gas amount estimation means in the invention.

In the routine shown in FIG. 3A, the ECU 30 firstly acquires the operation state of the engine 1 in step S11. What are acquired as the operation state of the engine 1 include, for example, the rotation speed of the engine 1, the intake air amount, the amount of fuel to be injected from each injector 14, the opening degree of the low-pressure EGR valve 23, the opening degree of the high-pressure EGR valve 24, the air-fuel ratio of exhaust gas, etc. Subsequently in step S12, the ECU 30 determines whether or not the fuel-cut of the engine 1 is being performed. It suffices to perform this determination on the basis of the determination as to whether the foregoing predetermined fuel-cut condition is satisfied. If the predetermined fuel-cut condition is satisfied, it is determined that the fuel-cut is being executed.

If it is determined that the fuel-cut is being executed, the process proceeds to step S13, in which the ECU 30 determines whether or not the $CO_2$ concentration CO2EH in exhaust gas at the time of start of the fuel-cut has already been acquired. If it is determined that the $CO_2$ concentration in exhaust gas has already been acquired, the process skips steps S14 to S16, and proceeds to step S17. On the other hand, if it is determined that the $CO_2$ concentration CO2EH in exhaust gas has not been acquired, the process proceeds to step S14, in which the ECU 30 acquires the $CO_2$ concentration in exhaust gas. In the case where fuel completely burns in the cylinders, the components contained in the exhaust gas can be considered to be only $CO_2$, nitrogen ($N_2$), oxygen ($O_2$) and water ($H_2O$). The other components contained in exhaust gas are very small in concentration as compared with the foregoing four components, and are therefore ignored. The $CO_2$ concentration in the atmosphere is also small as compared with the concentration of $CO_2$ produced by combustion of fuel, and therefore can be ignored. When a fuel burns, $CO_2$ and $H_2O$ are generated in accordance with the ratio of carbon (C) and hydrogen (H) of the fuel. If the $CO_2$ concentration in the atmosphere is ignored, the $CO_2$ contained in exhaust gas can be considered to be generated by the consumption of $O_2$ of the intake gas in the combustion of fuel. That is, it can be considered that the amount of decrease of $O_2$ from the $O_2$ concentration in intake gas and the amount of increase of $CO_2$ have a proportional relationship. Besides, $H_2O$ generated by the combustion of fuel can be considered in substantially the same manner. In this case, the chemical formula can be expressed as $CmHn + AF \times (m+n/4) \times O_2 + AF \times (79/21) \times (m+n/4) \times N_2 \rightarrow mCO_2 + (n/2) \times H_2O + (AF-1) \times (m+n/4) \times O_2 + (79/21) \times (m+n/4) \times N_2$, where m is a constant determined on the basis of the ratio of carbon (C) in the fuel, and n is a constant determined on the basis of the ratio of hydrogen (H) in the fuel, and AF is the air-fuel ratio. In the equation, (79/21) is the proportion of $N_2$ in air to $O_2$ in air. The proportions of the components $CO_2$, $N_2$, $O_2$ and $H_2O$ contained in exhaust gas can be represented in a single equation, using the constants m, n determined on the basis of the ratio of carbon and hydrogen in fuel, and the air-fuel ratio AF of exhaust gas. Then, from this equation, it is possible to derive an equation for calculating the air-fuel ratio AF on the basis of the $O_2$ concentration and an equation for calculating the $CO_2$ concentration on the basis of the air-fuel ratio AF. Therefore, as for the concentrations of the component contained in exhaust gas, that is, $CO_2$, nitrogen ($N_2$), oxygen ($O_2$) and water ($H_2O$), the concentration of any three of these components can be estimated from the concentration of the other component, by assuming that fuel completely burns in the cylinders 2. Hence, the $O_2$ concentration in exhaust gas is acquired on the basis of the air-fuel ratio of exhaust gas detected by the air-fuel ratio sensor 12, and the $CO_2$ concentration CO2EH of exhaust gas is estimated on the basis of the acquired $O_2$ concentration. It suffices that this method of estimation be a well-known method, and therefore, detailed description thereof is omitted below.

Figure 4:
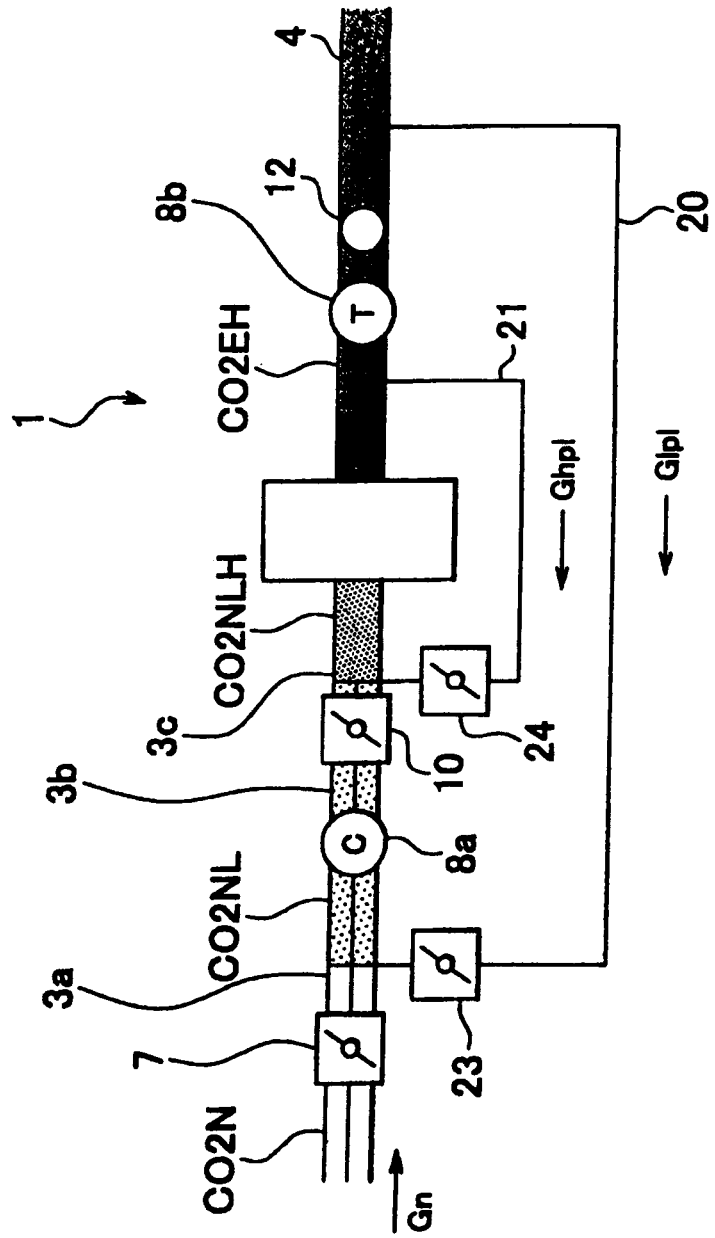
FIG. 4 is a diagram showing the states of gas in various portions at the time of start of the fuel-cut.

Then, in step S15, the ECU 30 sets an initial value of 0, that is, resets, a counter Fcsc provided for counting the number of times the pistons of the cylinders 2 have reciprocated, that is, the number of strokes thereof, following the start of the fuel-cut. After that, in step S16, the ECU 30 starts counting with the counter Fcsc. Incidentally, the counter Fcsc is provided for counting in order to determine whether or not the measurement-object gas has moved from the intake passage 3 to the exhaust passage 4 as described below, and therefore, the number of strokes is a count for all the cylinders instead of one cylinder. Subsequently in step S17, the ECU 30 fully closes the low-pressure EGR valve 23 and the high-pressure EGR valve 24, and fully opens the first throttle valve 7 and the second throttle valve 10. Incidentally, in the case where the valves have already been controlled to opening degrees as just mentioned, the present states of the valves are maintained. FIG. 4 shows states of gas in various portions at the time of start of the fuel-cut. During the fuel-cut, since the supply of fuel into the cylinders 2 is stopped, the gas in the intake passage 3 can be moved into the exhaust passage 4 via the cylinders 2. If at this time the EGR valves 23, 24 are open, exhaust gas is led into the intake passage 3, and therefore, the EGR valves 23, 24 are caused to be in the fully closed state.

On the other hand, if the throttle valves 7, 10 are closed, the suction of gas into the cylinders 2 becomes less easy. Therefore, the throttle valves 7, are fully open. This makes it possible to move the gas from the intake passage 3 to the exhaust passage 4. Specifically, by controlling the EGR valves 23, 24 and the throttle valves 7, 10, the gas existing in the downstream intake passage portion 3*c* at the time of start of the fuel-cut (hereinafter, sometimes referred to as the downstream portion gas), and the gas existing in the intermediate intake passage portion 3*b* at the time of start of the fuel-cut (hereinafter, sometimes referred to as the intermediate portion gas) can be moved sequentially to the location of the air-fuel ratio sensor 12.

Subsequently in step S18, the ECU 30 determines whether or not the value of the counter Fcsc is greater than a pre-set first criterion value FcscS1. The first criterion value FcscS1 is set at the number of strokes that it takes for the gas existing in the downstream intake passage portion 3*c* at the time of start of the fuel-cut to move to the location of the air-fuel ratio sensor 12. This number of strokes is set on the basis of the diameter of the cylinders 2, and the distance from the top dead center to the bottom dead center of the piston inserted in each cylinder 2, that is, the stroke length, as well as the capacity of the exhaust passage from the cylinders 2 to the air-fuel ratio sensor 12. If it is determined that the value of the counter Fcsc is less than or equal to the first criterion value FcscS1, the present cycle of the routine is ended. On the other hand, if it is determined that the value of the counter Fcsc is greater than the first criterion value FcscS1, the process proceeds to step S19, in which the ECU 30 determines whether or not the $CO_2$ concentration CO2NLH of the gas existing in the downstream intake passage portion 3*c* at the time of start of the fuel-cut (i.e., the downstream portion gas) has already been acquired. If it is determined that the $CO_2$ concentration CO2NLH of the downstream portion gas has already been acquired, the process skips steps S20 to S22, and proceeds to step S23. On the other hand, if it is determined that the $CO_2$ concentration CO2NLH of the downstream portion gas has not been acquired, the process proceeds to step S20, in which the ECU 30 fully closes the second throttle valve 10. By fully closing the second throttle valve 10 in this manner, the inflow of gas to the cylinders 2 can be restricted, so that the time that it takes until the downstream portion gas passes the location of the air-fuel ratio sensor 12 can be elongated.

Subsequently in step S21, the ECU 30 acquires the $CO_2$ concentration CO2NLH of the downstream portion gas. As for the downstream portion gas, too, one of the $CO_2$ concentration, the $N_2$ concentration, the $O_2$ concentration and the $H_2O$ concentration of the downstream portion gas is acquired, the concentration of the other components can be estimated from the acquired concentration, as is the case with the foregoing exhaust gas. Therefore, when the downstream portion gas is passing the location of the air-fuel ratio sensor 12, the $O_2$ concentration of the gas is acquired by the air-fuel ratio sensor 12. Then, the $CO_2$ concentration CO2NLH of the downstream portion gas is estimated on the basis of the $O_2$ concentration. The $CO_2$ concentration of intake gas can also be estimated similarly to the $CO_2$ concentration of exhaust gas as described above. For example, in the case where exhaust gas is being recirculated, the exhaust gas is mixed with intake air; however, from another viewpoint, it can be considered that a large amount of intake air is mixed with exhaust gas. Then, it can be considered that the introduction of a large amount of fresh air into exhaust gas has increased the air-fuel ratio of exhaust gas. Therefore, the $O_2$ concentration of the gas is acquired, and the air-fuel ratio of the gas is calculated on the basis of the $O_2$ concentration. After that, using the calculated air-fuel ratio and the ratio between carbon and hydrogen of fuel, the $CO_2$ concentration of the gas can be estimated on the basis of the above-described estimation method for the $CO_2$ concentration. Incidentally, the $CO_2$ concentration estimation method is not limited to the aforementioned method. For example, a generally employed $CO_2$ concentration estimation method may be used to estimate the $CO_2$ concentration. Subsequently in step S22, the ECU 30 fully opens the second throttle valve 10.

After that, in step S23 in FIG. 3B, the ECU 30 determines whether or not the value of the counter Fcsc is greater than a pre-set second criterion value FcscS2. The second criterion value FcscS2 is set at the number of strokes that it takes for the gas existing in the intermediate intake passage portion 3b at the time of start of the fuel-cut (i.e., the intermediate portion gas) to move to the location of the air-fuel ratio sensor 12. Therefore, the second criterion value FcscS2 is set at a greater value than the first criterion value FcscS1. If it is determined that the value of the counter Fcsc is less than or equal to the second criterion value FcscS2, the present cycle of the routine is ended.

Figure 5:
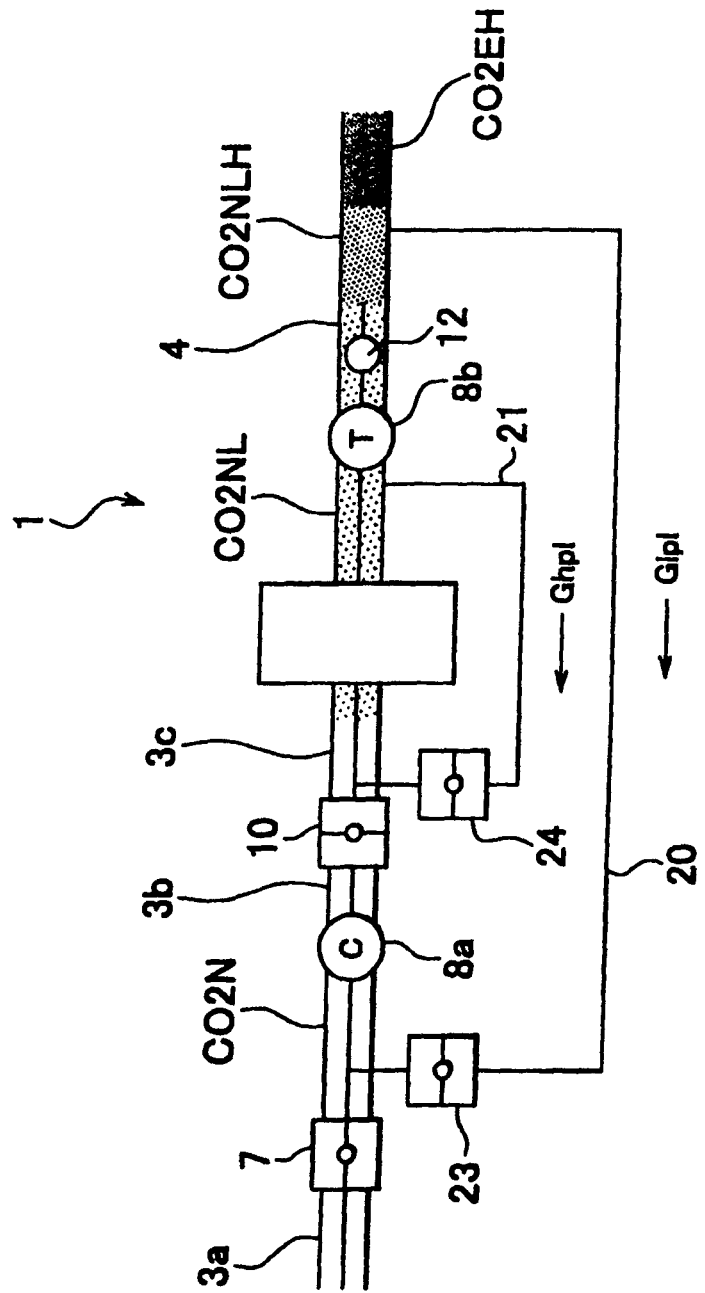
FIG. 5 is diagram showing the states of gas in various portions when the intermediate portion gas has moved to the location of an air-fuel ratio sensor.

On the other hand, if it is determined that the value of the counter Fcsc is greater than the second criterion value FcscS2, the process proceeds to step S24, in which the ECU 30 fully closes the low-pressure EGR valve 23, the high-pressure EGR valve 24, the first throttle valve 7 and the second throttle valve 10. In the case where the value of the counter Fcsc is greater than the second criterion value FcscS2, it can be determined that the intermediate portion gas has already moved to the location of the air-fuel ratio sensor 12; therefore, by fully closing the EGR valves 23, 24 and the throttle valves 7, 10, the time that it takes until the gas passes the location of the air-fuel ratio sensor 12 can be elongated. FIG. 5 shows states of the gas in various portions of the engine 1 as the intermediate portion gas moves to the location of the air-fuel ratio sensor 12. In step S25, following step S24, the ECU 30 acquires the $CO_2$ concentration CO2NL of the intermediate portion gas. The $CO_2$ concentration CO2NL of the intermediate portion gas can also be estimated on the basis of the $O_2$ concentration of the intermediate portion gas, similarly to the $CO_2$ concentration CO2NLH of the downstream portion gas described above. Therefore, the $O_2$ concentration of the intermediate portion gas is acquired from the air-fuel ratio sensor 12, and the $CO_2$ concentration CO2NL is estimated on the basis of the $O_2$ concentration.

Next, in step S26, the ECU 30 estimates the flow amount Glpl of the first EGR gas and the flow amount Ghpl of the second EGR gas at the time of start of the fuel-cut on the basis of the estimated $CO_2$ concentration CO2EH of exhaust gas, the estimated $CO_2$ concentration CO2NLH of the downstream portion gas and the estimated $CO_2$ concentration CO2NL of the intermediate portion gas. Subsequently in step S27, the ECU 30 resets the $CO_2$ concentrations CO2EH, CO2NLH, CO2NL by setting the initial value 0, so that a state in which none of the $CO_2$ concentrations has been acquired is established, and the ECU 30 also resets the counter Fcsc by setting the initial value 0. After that, the ECU 30 ends the present cycle of the routine.

If in step S12 in FIG. 3A it is determined that the fuel-cut is not being executed, the process proceeds to step S28, in which the ECU 30 resets the values of the $CO_2$ concentration CO2EH of exhaust gas, the $CO_2$ concentration CO2NLH of the downstream portion gas, the $CO_2$ concentration CO2NL of the intermediate portion gas by setting the initial value 0 thereto, so that the state in which none of the $CO_2$ concentrations has been acquired is re-established, and also resets the counter Fcsc. Subsequently in step S29, the ECU 30 controls the opening degree of each of the EGR valves 23, 24 and the throttle valves 7, 10 according to the operation state of the engine 1. Hereinafter, this control will sometimes be referred to as the ordinary control. After that, the present cycle of the routine is ended.

As described above, according to the first embodiment, by adjusting the opening degrees of the EGR valves 23, 24 and the throttle valves 7, 10 during the fuel-cut, the gas existing in the downstream intake passage portion 3c at the time of start of the fuel-cut (i.e., the downstream portion gas) and the gas existing in the intermediate intake passage portion 3b (i.e., the intermediate portion gas) at the time of start of the fuel-cut can be sequentially moved to the location of the air-fuel ratio sensor 12, so that the $CO_2$ concentrations of these gases can each be acquired. Therefore, the flow amount Glpl of the first EGR gas and the flow amount Ghpl of the second EGR gas at the time of start of the fuel-cut can each be estimated. Besides, the correspondence relations between the opening degrees of the EGR valves 23, 24 and the flow amounts of gas passing therethrough can each be corrected on the basis of the flow amount Glpl of the first EGR gas and the flow amount Ghpl of the second EGR gas estimated as described above as well as the opening degrees of the EGR valves 23, 24 at the time of start of the fuel-cut. Therefore, the flow amount Glpl of the first EGR gas and the flow amount Ghpl of the second EGR gas can be adjusted with good accuracy. Incidentally, since the flow amounts of the EGR gases are estimated in this manner, the predetermined fuel-cut condition corresponds to an EGR gas amount estimation condition in the invention. In addition, the $O_2$ concentration of the downstream portion gas corresponds to a first oxygen concentration in the invention, and the $O_2$ concentration of the intermediate portion gas corresponds to a second oxygen concentration in the invention.

Second Embodiment

Figure 6:
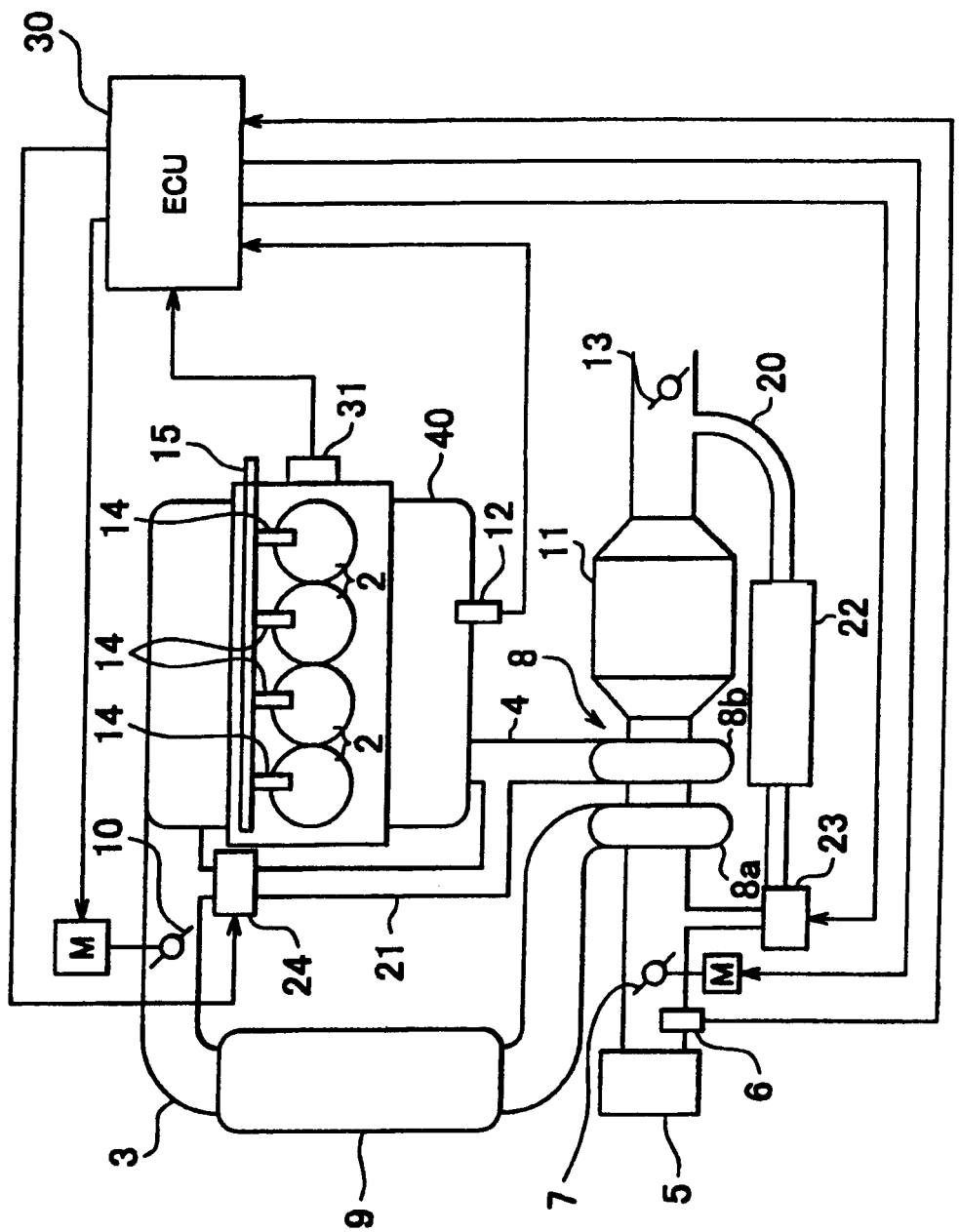
FIG. 6 is a diagram showing an internal combustion engine in which an exhaust gas recirculation device in accordance with a second embodiment of the invention is incorporated.
Figure 7:
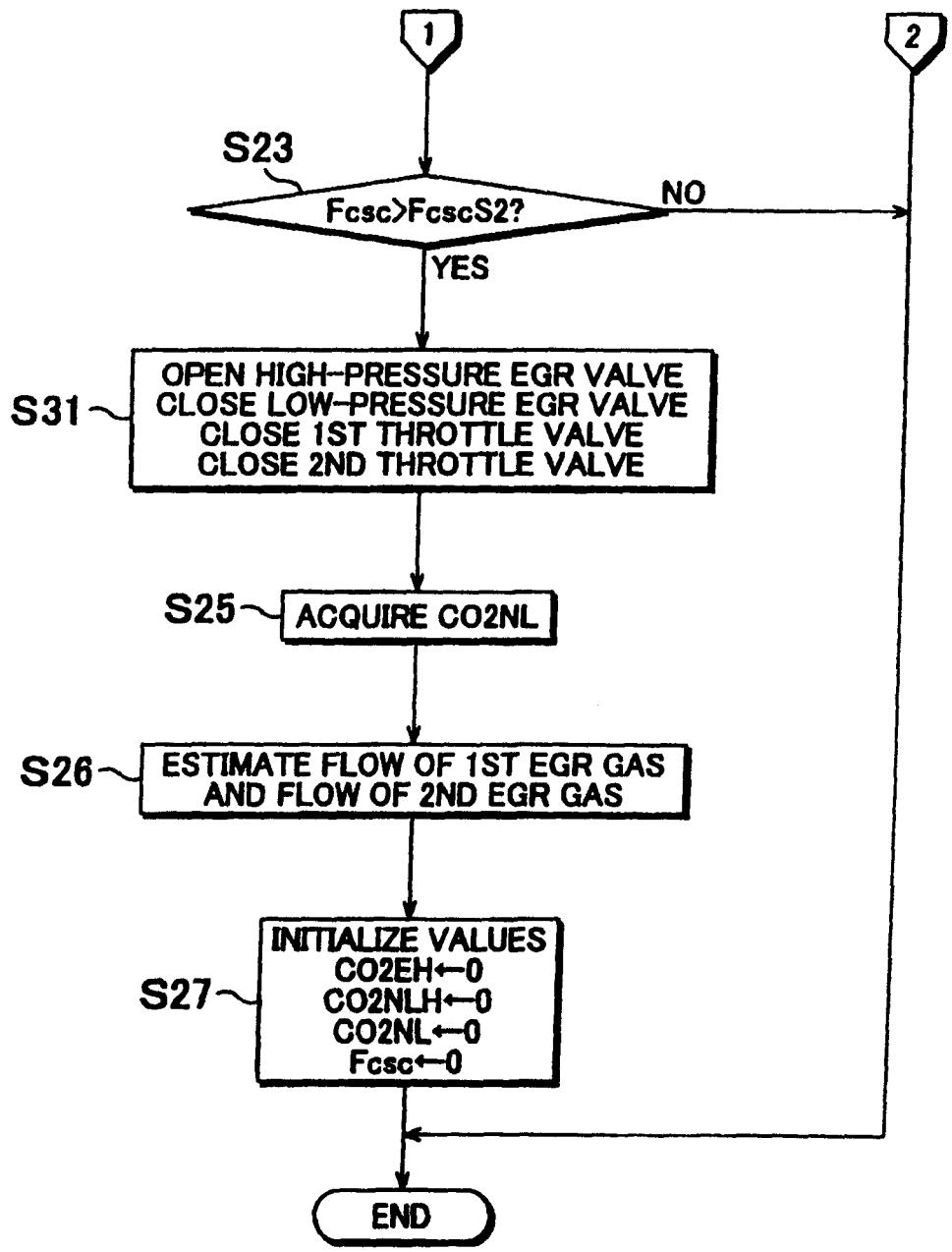
FIG. 7 is a flowchart showing a portion of an EGR gas amount-estimating routine in accordance with the second embodiment.
Figure 8:
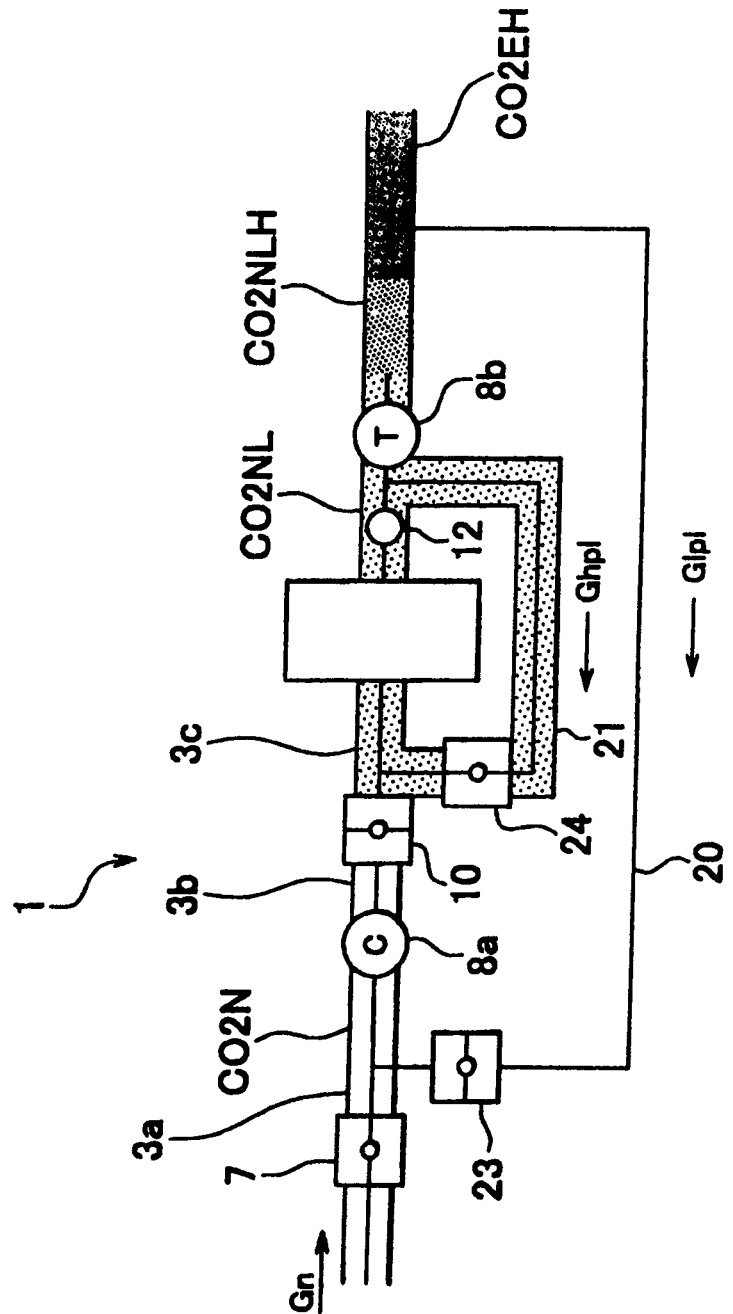
FIG. 8 is a diagram showing the states of gas in various portions in the internal combustion engine in accordance with the second embodiment when the intermediate portion gas has moved to the location of the air-fuel ratio sensor.

Next, a second embodiment of the invention will be described with reference to FIGS. 6 to 8. As shown in FIG. 6, in the second embodiment, an air-fuel ratio sensor 12 is provided in an exhaust manifold 40 that forms a portion of an exhaust passage 4. That is, in the second embodiment, the air-fuel ratio sensor 12 is provided in the exhaust passage 4 upstream of the position of its connection with a high-pressure EGR passage 21. The second embodiment is different in this respect from the first embodiment, and in the other respects, is substantially the same as the first embodiment. Therefore, the portions common between the first and second embodiments are presented with the same reference characters, and descriptions thereof are omitted below. FIG. 7 shows a portion of an EGR gas amount-estimating routine that an ECU 30 in the second embodiment repeatedly executes at every predetermined cycle period during operation of the engine 1. Incidentally, FIG. 7 corresponds to the portion of the EGR gas amount-estimating routine of the first embodiment that is shown in FIG. 3B. The other portions are the same as those in the first embodiment, and illustrations in the drawings and descriptions thereof are omitted. Incidentally, the same processes in FIGS. 7 and 3B are presented with the same reference characters, and descriptions thereof are omitted below.

In the EGR gas amount-estimating routine in the second embodiment, the ECU 30 carries out the same processes up to step S23 as in the first embodiment. If in step S23 it is determined that the counter Fcsc is greater than a second criterion value FcscS2, the process proceeds to step S31, in which the ECU 30 fully opens the high-pressure EGR valve 24, and fully closes the low-pressure EGR valve 23, the first throttle valve 7, and the second throttle valve 10. In that case, gas having passed the air-fuel ratio sensor 12 can be led into the intake passage 3 via the high-pressure EGR passage 21, and can be led again to the air-fuel ratio sensor 12 via the cylinders 2, as shown in FIG. 8. That is, the intermediate portion gas can be circulated by using the high-pressure EGR passage 21.

Next, in step S25, the ECU 30 estimates the $CO_2$ concentration CO2NL of the intermediate portion gas. After that, the same processes as those in the first embodiment shown in FIG. 3B are carried out. After that, the present cycle of the routine is ended.

According to the second embodiment, the gas existing in the intermediate intake passage portion 3b at the time of start of the fuel-cut (i.e., the intermediate portion gas) can be circulated via the high-pressure EGR passage 21. Since the air-fuel ratio sensor 12 is provided in the circulation path, the $O_2$ concentration of this gas can be reliably acquired. Besides, since the gas can be circulated and taken into the cylinders 2 in this manner, excessive decline in the pressure in the cylinders can be restrained, so that the oil loss in which oil enters the combustion chambers through the gaps between the pistons and the cylinders 2 can be restrained.

Third Embodiment

Figure 9:
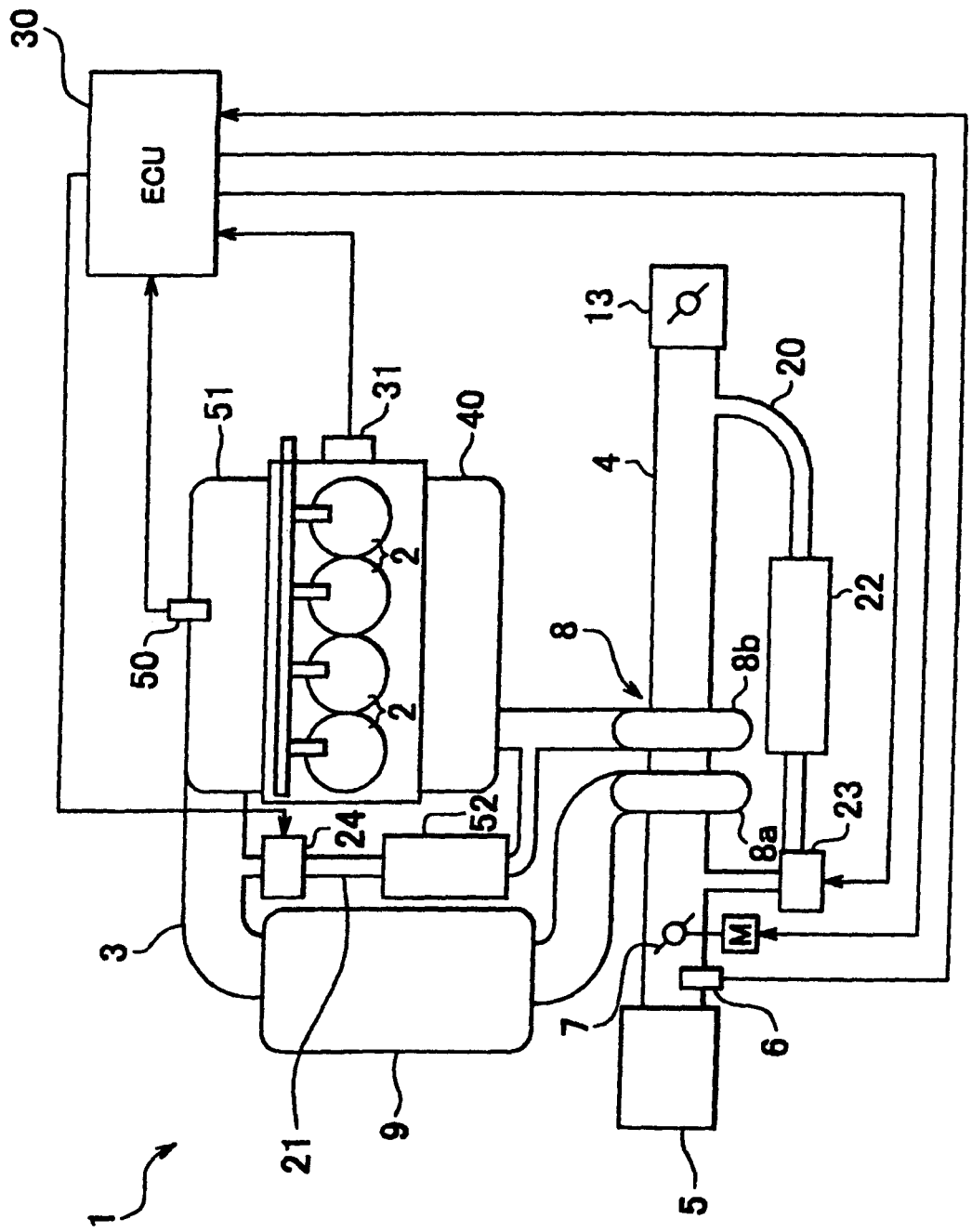
FIG. 9 is a diagram showing an internal combustion engine in which an exhaust gas recirculation device in accordance with a third embodiment of the invention is incorporated.

A third embodiment of the invention will be described with reference to FIGS. 9 to 14. FIG. 9 shows an engine in which an exhaust gas recirculation device in accordance with a third embodiment of the invention is incorporated. Incidentally, portions common between FIGS. 9 and 1 are presented with the same reference characters, and descriptions thereof are omitted below. As shown in FIG. 9, the third embodiment is different from the other embodiments, in that an $O_2$ sensor 50 as oxygen concentration acquisition means for outputting a signal corresponding to the concentration of oxygen, which is a measurement-object gas, is provided in an intake passage 3 downstream of the position of its connection with the high-pressure EGR passage 21. Incidentally, as shown in FIG. 9, the $O_2$ sensor 50 is provided in an intake manifold 51 that forms a portion of an intake passage 3. Besides, the high-pressure EGR passage 21 is provided with an exhaust purification catalyst 52, and the second throttle valve 10 is omitted. The exhaust purification catalyst 11 of the exhaust passage 4 is omitted from the illustration.

Figure 10:
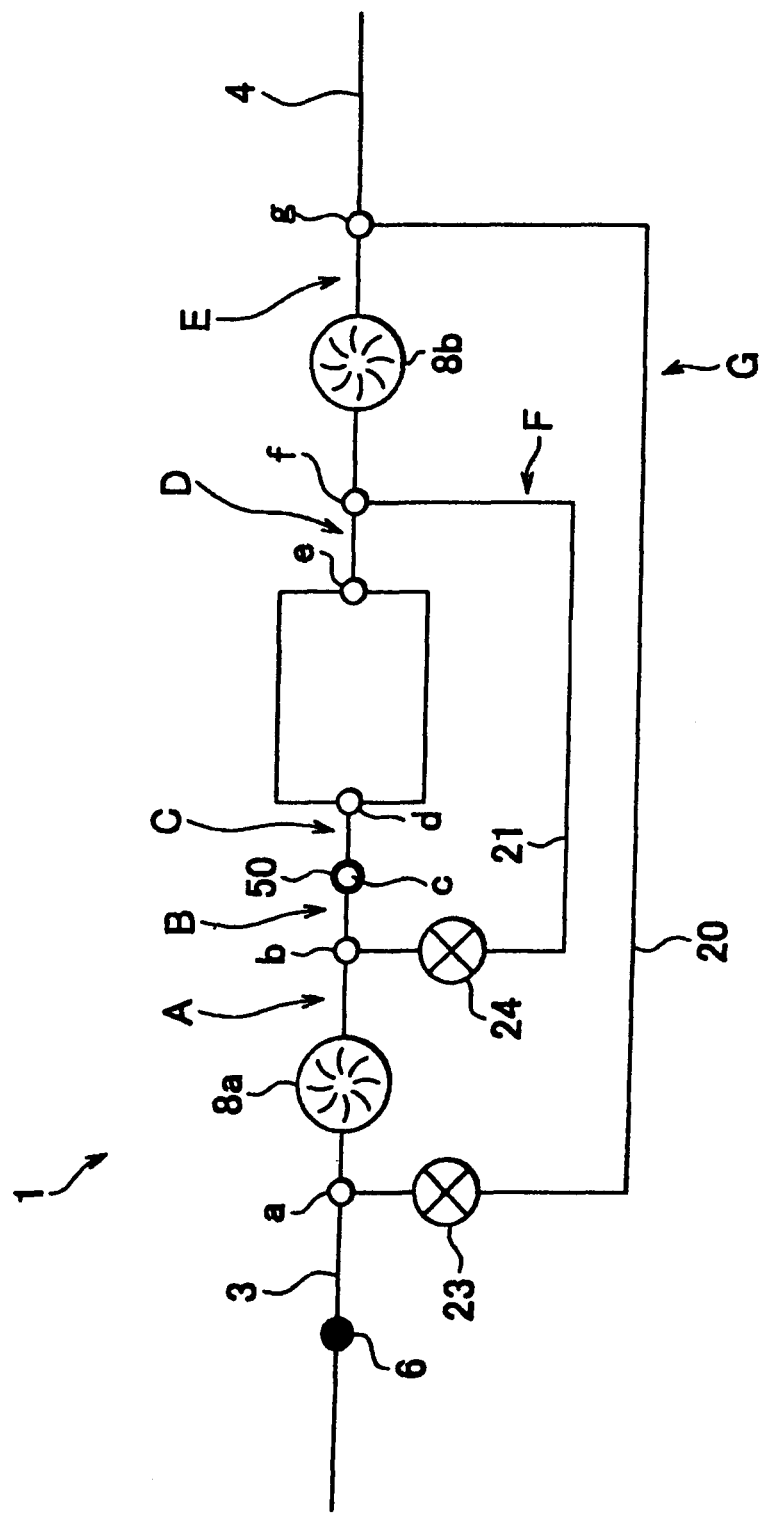
FIG. 10 is a diagram for describing an estimation method for the EGR gas amount in the third embodiment.

With reference to FIG. 10, a method of estimating the flow amount Glpl of the first EGR gas and the flow amount Ghpl of the second EGR gas in the third embodiment will be described. FIG. 10 is a diagram for describing flows of gas in various portions of the engine 1 shown in FIG. 9. Portions common between FIG. 10 and FIG. 9 are presented with the same reference characters. Incidentally, in FIG. 10, the compressor 8a and the turbine 8b of the turbocharger 8 are shown separated, for the sake of convenience in illustration.

In order to describe the estimation method for the flow amount of EGR gas, points a to g are set on a channel of gas in the engine 1 as shown in FIG. 10. Incidentally, the point a is set at the position of connection between a low-pressure EGR passage 20 and the intake passage 3, and the point b is set at the position of connection between a high-pressure EGR passage 21 and the intake passage 3, and the point c is set at the position at which the air-fuel ratio sensor 12 is disposed, and the point d is set at the position between the intake passage 3 and the cylinders 2. Besides, the point e is set at the position of connection between the cylinders 2 and the exhaust passage 4, and the point f is set at the position of connection between the high-pressure EGR passage 21 and the exhaust passage 4, and the point g is set at the point of connection between the low-pressure EGR passage 20 and the exhaust passage 4. The intervals specified by the points a to g are defined as intervals A to G Incidentally, the interval A is set as a portion of the intake passage 3 that extends from the point a to the point b, and the interval B is set as a portion of the intake passage 3 that extends from the point b and the point c, and the interval C is set as a portion of the intake passage 3 that extends from the point c to the point d. Besides, the interval D is set as a portion of the exhaust passage 4 that extends from the point e to the point f, and the interval E is set as a portion of the exhaust passage 4 that extends from the point f to the point g, and the interval F is set as a portion of the high-pressure EGR passage 21 that extends from the point f to the point b, and the interval G is set as a portion of the low-pressure EGR passage 20 that extends from the point g to the point a.

Figure 11:
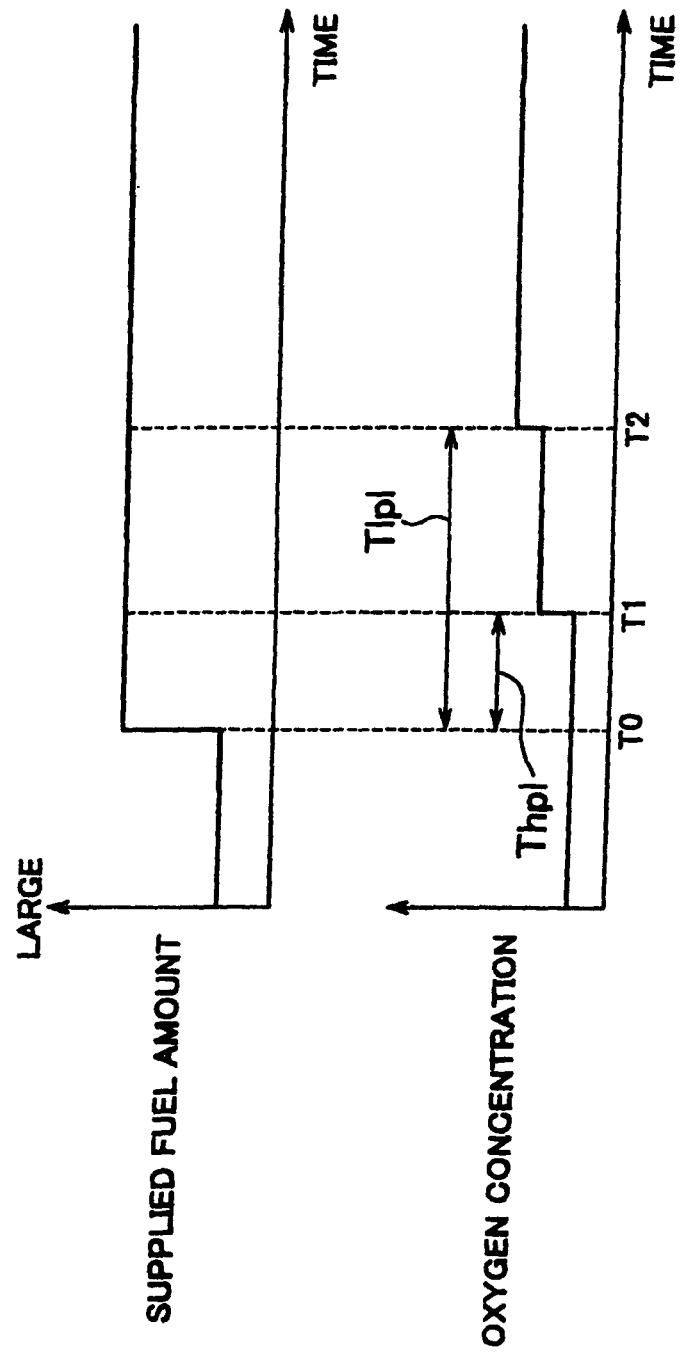
FIG. 11 is a diagram showing an example of the time-dependent changing of the supplied fuel amount and the oxygen concentration of intake gas.

In the engine 1 shown in FIG. 9, if the amount of fuel supplied to the engine 1 changes, the oxygen concentration of exhaust gas changes depending on the change in the amount of fuel supply. In the case where the exhaust gas with a thus-changed oxygen concentration is recirculated to the intake passage 3 via the low-pressure EGR passage 20 and the high-pressure EGR passage 21, the exhaust gas with the changed oxygen concentration is recirculated to the intake passage 3 firstly via the high-pressure EGR passage 21, and then is recirculated to the intake passage 3 via the low-pressure EGR passage 20, since the high-pressure EGR passage 21 is connected to the exhaust passage 4 at a position upstream of the position of connection of the low-pressure EGR passage 20. Therefore, the oxygen concentration detected by the $O_2$ sensor 50 changes in two steps as shown in FIG. 11. The change in the oxygen concentration at the first step at time T1 in FIG. 11 is a result of the influence of the exhaust gas recirculated via the high-pressure EGR passage 21, and the change in the oxygen concentration at the second step at time T2 is a result of the influence of the exhaust gas recirculated via the low-pressure EGR passage 20. The duration Thpl from the time T0 at which the amount of fuel supplied to the engine 1 changes to the time T1 at which the first step of change of the oxygen concentration occurs (hereinafter, sometimes referred to as the HPL delay time) has a correlation with the flow amount Ghpl of the second EGR gas. Besides, the duration Tlpl from the time T0 to a time T2 at which the second step of change of the oxygen concentration (hereinafter, sometimes referred to as LPL delay time) has a correlation with the flow amount Glpl of the first EGR gas. Therefore, in the third embodiment, the flow amount Glpl of the first EGR gas and the flow amount Ghpl of the second EGR gas are estimated on the basis of the delay times Thpl, Tlpl.

The LPL delay time Tlpl can be expressed using the transit times $T_A$ to $T_G$ of gas through the intervals A to G in FIG. 10, as in the following equation (11). Incidentally, the transit time $T_A$ represents the duration that is needed for gas to pass through the interval A. Likewise, each of the transit times $T_B$ to $T_G$ represents the duration that is needed for gas to pass through a corresponding one of the intervals that is represented by the same subscript. Hereinafter, the variables used in the mathematical expressions are suffixed with the subscripts A to G in order to distinguish the intervals. In addition, when the distinction is not needed, the subscript is omitted.

[Mathematical Expression 11]

$$Tlpl = T_D + T_E + T_G + T_A + T_B \quad (11)$$

The HPL delay time Thpl can be similarly expressed using the transit times $T_A$ to $T_G$ as in the following equation (12).

[Mathematical Expression 12]

$$Thpl = T_D + T_F + T_B \qquad (12)$$

By subtracting the equation (12) from the equation (11), the equation (13) is derived.

[Mathematical Expression 13]

$$Tlpl - Thpl = T_E + T_G + T_A - T_F \qquad (13)$$

Generally, the transit time T that is needed for gas to pass through an interval can be calculated from the average gas mass flow amount G, the average temperature t of the gas in the interval, the average gas density ρ, and the interval's capacity V, as in the following equation (14). Incidentally, since the average gas density ρ changes according to the temperature t, the average gas density ρ is expressed as a function of the temperature t in the equation (14).

[Mathematical Expression 14]

$$T = \frac{V}{\frac{G}{\rho(t)}} \qquad (14)$$

If the relation of the equation (14) is applied to the equation (13), the following equation (15) is derived.

[Mathematical Expression 15]

$$Tlpl - Thpl = \frac{V_E}{\frac{G_E}{\rho_E(t_E)}} + \frac{V_G}{\frac{G_G}{\rho_G(t_G)}} + \frac{V_A}{\frac{G_A}{\rho_A(t_A)}} - \frac{V_F}{\frac{G_F}{\rho_F(t_F)}} \qquad (15)$$

The capacity $V_A$ to $V_G$ of each interval A to G can be found beforehand from the diameters and lengths of the intake passage 3, the exhaust passage 4, the low-pressure EGR passage 20, and the high-pressure EGR passage 21 of the engine 1 shown in FIG. 10, if the values thereof are determined. Besides, the relation between the gas density ρ and the average temperature t of the gas can be found beforehand by assuming components of the gas flowing through each interval. Furthermore, the temperature t of the gas can also be found by detecting via a temperature sensor or the like, or by an estimation based on the operation state of the engine 1. It suffices that the estimation method for the temperature t of the gas be a well-known method, and therefore detailed description of the estimation method is omitted. Then, the factors that can be found as described above are replaced by a constant K as shown in the equation (16).

[Mathematical Expression 16]

$$K = V \cdot \rho(t) \qquad (16)$$

Then, using the constant K, the equation (15) can be written into the equation (17).

[Mathematical Expression 17]

$$Tlpl - Thpl = \frac{K_E}{G_E} + \frac{K_G}{G_G} + \frac{K_A}{G_A} - \frac{K_F}{G_F} \qquad (17)$$

Among the factors in this equation, the flow amount $G_E$ can be expressed using the flow amount $G_D$ and the HPL EGR rate Regrh as in the equation (18), taking the distribution of EGR gas into account.

[Mathematical Expression 18]

$$G_E = G_D \times (1 - Regrh) \qquad (18)$$

The flow amount $G_D$ can be expressed using the flow amount $G_C$ and the supplied fuel amount Q as in the equation (19), on the assumption that what is sucked from the intake passage 3 into the cylinders and what is supplied into the cylinders are all discharged from the cylinders 2 into the exhaust passage 4.

[Mathematical Expression 19]

$$G_D = G_c + Q \qquad (19)$$

Therefore, the equation (18) can be changed into the equation (20), by applying the relation of the equation (19).

[Mathematical Expression 20]

$$G_E = (G_c + Q) \times (1 - Regrh) \qquad (20)$$

Besides, the flow amount $G_A$ can be expressed using the flow amount $G_G$ in the interval G and the flow amount $G_{afm}$ of fresh air detected by the air flow meter 6, as in the equation (21).

[Mathematical Expression 21]

$$G_A + G_{afm} + G_G \qquad (21)$$

The flow amount $G_F$ can be expressed using the flow amount $G_D$ in the interval D and the HPL EGR rate Regrh, as in the equation (22).

[Mathematical Expression 22]

$$G_F = G_D \times Regrh \qquad (22)$$

Then, the equation (22) can be changed into the equation (23) by applying the relation of the equation (19).

[Mathematical Expression 23]

$$G_F = (G_C + Q) \times Regrh \qquad (23)$$

By the way, the LPL EGR rate Regrl can be expressed using the flow amount $G_C$ in the interval C and the flow amount $G_G$ in the interval G, as in the equation (24).

[Mathematical Exprsesion 24]

$$Regrl = \frac{G_G}{G_C} \qquad (24)$$

The HPL EGR rate Regrh is a value obtained by subtracting the LPL EGR rate Regrl from the total EGR rate Regr, and is also a value obtained by divining the flow amount $G_F$ in the interval F by the flow amount $G_c$ in the interval C. Since the flow amount $G_F$ in the interval F is a value obtained by subtracting the flow amount $G_G$ in the interval G and the flow amount $G_{afm}$ of fresh air from the flow amount $G_c$ in the interval C, the HPL EGR rate Regrh can be expressed using the flow amount $G_c$ in the interval C, the flow amount $G_G$ in the interval G, and the flow amount $G_{afm}$ of fresh air, as in the equation (25).

[Mathematical Expression 25]

$$Regrh = Regr - Regrl = \frac{G_C - G_{afm} - G_G}{G_C} \quad (25)$$

The flow amount $G_C$ in the interval C can be calculated on the basis of the detected value from the $O_2$ sensor 50 provided in the intake passage 3. The oxygen concentration O2s of the gas in the interval C is determined on the basis of the oxygen concentration of fresh air and the oxygen concentration of the exhaust gas recirculated into the intake passage. Therefore, oxygen concentration O2s of the gas in the interval C can be expressed using the oxygen concentration O2air of air, the total EGR rate Regr, and the air excess rate λ, as in the equation (26).

[Mathematical Expression 26]

$$O2_S = O2_{air} \times \left(1 - \frac{Regr}{\lambda}\right) \quad (26)$$

The air excess rate λ in this equation can be expressed using the stoichiometric air-fuel ratio, the supplied fuel amount, and the flow amount of fresh air. That is, the air excess rate is a value obtained by dividing the stoichiometric air-fuel ratio by the supplied fuel amount and then multiplying the result of the division by the flow amount of fresh air. Using a constant β that is a value obtained by diving the stoichiometric air-fuel ratio by the oxygen concentration O2air as well as the supplied fuel amount Q and the flow amount $G_{afm}$ of fresh air, the equation (26) is changed into the equation (27).

[Mathematical Expression 27]

$$\frac{O2_s}{O2_{air}} = O2_{air} - \frac{Regr}{\frac{\beta \cdot G_{afm}}{Q}} \quad (27)$$

Besides, the total EGR rate Regr can be expressed by the flow amount $G_C$ in the interval C and the flow amount $G_{afm}$ of fresh air as shown in the equation (28).

[Mathematical Expression 28]

$$Regr = Regrh + Regrl = \frac{G_F + G_G}{G_C} = \frac{G_C - G_{afm}}{G_C} \quad (28)$$

Therefore, by substituting the equation (28) in the equation (27), the equation (29) is derived.

[Mathematical Expression 29]

$$\frac{O2_S}{O2_{air}} = O2_{air} - \frac{\frac{G_c - G_{afm}}{G_c}}{\frac{\beta \cdot G_{afm}}{Q}} \quad (29)$$

Then, by rearranging the equation (29), the equation (30) is derived.

[Mathematical Expression 30]

$$G_C = \frac{G_{afm}}{1 - \left(O2_{air} - \frac{O2_S}{O2_{air}}\right) \times \left(\frac{\beta \cdot G_{afm}}{Q}\right)} \quad (30)$$

Figure 12A:
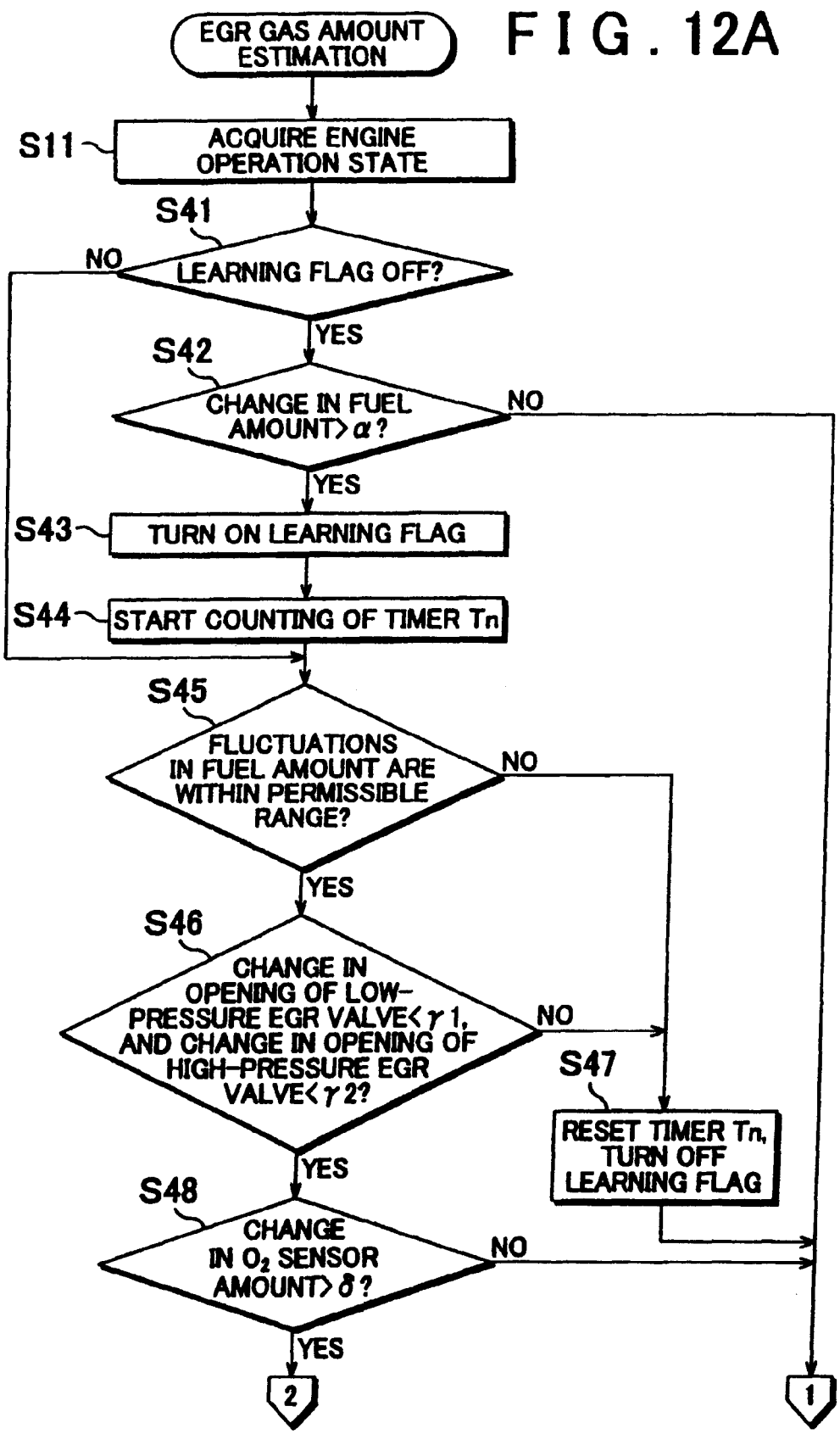

Thus, the flow amount $G_C$ in the interval C can be calculated on the basis of the flow amount $G_{afm}$ of fresh air, the oxygen concentration O2s of intake gas, and the supplied fuel amount Q. Then, after the equation (20), the equation (21), the equation (23), the equation (24), the equation (25) and the equation (30) are substituted in the equation (17), the unknown quantities in the equation (17) are only the flow amount $G_G$ in the interval G, the LPL delay time Tlpl, and the HPL delay time Thpl. Therefore, in order to acquire the LPL delay time Tlpl and the HPL delay time Thpl and estimate the flow amount $G_G$, that is, the flow amount Glpl of the first EGR gas on the basis of the acquired delay times, the ECU 30 repeatedly executes the EGR gas amount-estimating routine shown in FIGS. 12A and 12B at every predetermined cycle period during operation of the engine 1. FIG. 12B is a flowchart continuing from FIG. 12A. Incidentally, the processes in FIG. 12A that are the same as those in FIG. 3A are presented with the same reference characters, and descriptions thereof are omitted below.

In the routine shown in FIG. 12A, the ECU 30 firstly acquires the operation state of the engine 1 in step S11. In this process, the oxygen concentration of intake gas is also acquired via the $O_2$ sensor 50. Subsequently in step S41, the ECU 30 determines whether or not a learning flag for showing that the LPL delay time Tlpl and the HPL delay time Thpl have been acquired is off. If it is determined that the learning flag is on, the process skips the steps S42 to S44, and proceeds to step S45. On the other hand, if it is determined that the learning flag is off, the process proceeds to step S42, in which the ECU 30 determines whether or not the amount of change in the amount of fuel to be injected from each injector 14 (hereinafter, sometimes referred to as the amount of change of fuel) is greater than a pre-set predetermined criterion amount α. In the case where the amount of change of fuel is small, the oxygen concentration of the gas in the intake passage 3 undergoes substantially no change if the exhaust gas produced after the amount of fuel has been changed is recirculated into the intake passage 3, so that the change in the oxygen concentration may not be able to be detected by the $O_2$ sensor 50. Therefore, the predetermined criterion amount α is set at, for example, an amount of change of fuel that reliably allows the $O_2$ sensor 50 to detect the change in the oxygen concentration of the gas in the intake passage 3. This value is appropriately set according to the performance of the $O_2$ sensor 50, and the like. If it is determined that the amount of change of fuel is less than or equal to the predetermined criterion amount α, the present cycle of the routine is ended.

On the other hand, if it is determined that the amount of change of fuel is greater than the predetermined criterion amount α, the process proceeds to step S43, in which the ECU 30 switches the learning flag on. Subsequently in step S44, the ECU 30 sets the value of a timer Tn for measuring the delay times Tlpl, Thpl to the initial value 0, and starts the timer-counting from the initial value.

Subsequently in step S45, the ECU 30 determines whether or not the amounts of fuel to be injected from the injectors 14 have been within a predetermined permissible range whose center is the post-change amount of fuel. In other words, the ECU 30 determines whether or not the fluctuations in the post-change amount of fuel have been within the predetermined permissible range. In the case where the amount of fuel further changes to a great degree during the measurement of the delay times, the change in the amount of fuel affects the oxygen concentration of the gas in the intake passage 3, so that a change other than the measurement object appears in the value detected by the $O_2$ sensor 50. In order to avoid this, a predetermined permissible range is set, and the measurement of the delay times is stopped if the post-change amount of fuel further changes beyond the predetermined permissible range. The upper-limit and lower-limit values of the predetermined permissible range are set at such amounts of change of fuel that, as long as the amount of fuel changes within the permissible range, the recirculation of the exhaust gas to the intake passage 3 causes substantially no change in the oxygen concentration in the intake passage 3. If it is determined that the fluctuations in the post-change amount of fuel have been within the permissible range, the process proceeds to step S46. In step S46, the ECU 30 determines whether or not the change in the opening degree of the low-pressure EGR valve 23 is less than a pre-set permissible value γ1 and the change in the opening degree of the high-pressure EGR valve 24 is less than a pre-set permissible value γ2. If the opening degrees of the EGR valves 23, 24 should greatly change during the measurement of the delay times, the flow amount of the first EGR gas and the flow amount of the second EGR gas each change, so that a change other than the measurement object appears. Therefore, to avoid this, the permissible values γ1, γ2 are set, and the measurement of the delay times is stopped if the opening degrees of the EGR valves 23, 24 change by an amount that is equal to or greater than the permissible values γ1, γ2. The permissible value γ1 is set at such an amount of change in the opening degree of the low-pressure EGR valve 23 that, as long as the change in the opening degree of the valve is less than the permissible value γ1, the flow amount of the first EGR gas undergoes substantially no change. The permissible value γ2 is also set on the basis of a relation between the change in the opening degree of the high-pressure EGR valve 24 and the flow amount of the second EGR gas.

If a negative determination is made in step S45, or if a negative determination is made in step S46, the process proceeds to step S47, in which the ECU 30 resets the timer Tn by setting the initial value 0 to the value of the timer Tn, and also switches the learning flag off. After that, the present cycle of the routine is ended.

On the other hand, if an affirmative determination is made in step S46, the process proceeds to step S48, in which the ECU 30 determines whether or not the amount of change in the detected value from the $O_2$ sensor 50 is greater than a predetermined criterion value δ. The predetermined criterion value δ is set as a reference for determining whether or not the change in the oxygen concentration detected by the $O_2$ sensor 50 is due to the influence of a change in the oxygen concentration in the exhaust gas that is recirculated into the intake passage 3. Therefore, the predetermined criterion value δ is set at, for example, an amount of change that allows a determination that the change is clearly a change that is the object of the time measurement. If it is determined that the amount of change in the detected value from the $O_2$ sensor 50 is less than or equal to the predetermined criterion value δ, the present cycle of the routine is ended.

On the other hand, if it is determined that the amount of change in the detected value from the $O_2$ sensor 50 is greater than the predetermined criterion value δ, the process proceeds to step S49 in FIG. 12B, in which the ECU 30 determines whether or not a measurement flag for showing that the HPL delay time Thpl has already been measured is off. If it is determined that the measurement flag is off, the process proceeds to step S50, in which the ECU 30 substitutes the then-provided value of the timer Tn for the HPL delay time Thpl, and thus acquires the HPL delay time Thpl. Subsequently in step S51, The ECU 30 switches the measurement flag on. After that, the present cycle of the routine is ended.

On the other hand, if it is determined that the measurement flag is on, the process proceeds to step S52, in which the ECU 30 substitutes the then-provided value of the timer Tn for the LPL delay time Tlpl, and thus acquires the LPL delay time Tlpl. Next, in step S53, the ECU 30 calculates the flow amount $G_G$ in the interval G, that is, the flow amount Glpl of the first EGR gas, on the basis of the LPL delay time Tlpl and the HPL delay time Thpl acquired as well as the foregoing estimation method. Furthermore, the flow amount $G_F$ in the interval F, that is, the flow amount Ghpl of the second EGR gas, is calculated on the basis of the calculated flow amount $G_G$ and the equation (23), the equation (25) and the equation (30). Subsequently in step S54, the ECU 30 resets the values of the HPL delay time Thpl and the LPL delay time Tlpl and the value of the timer Tn by setting 0 to these values. Besides, the ECU 30 switches the learning flag and the measurement flag off. Furthermore, the ECU 30 switches on a learning completion flag for showing that the flow amount Glpl of the first EGR gas and the flow amount Ghpl of the second EGR gas have been calculated. After that, the present cycle of the routine is ended.

As described above, according to the third embodiment, the flow amount Glpl of the first EGR gas and the flow amount Ghpl of the second EGR gas can be calculated on the basis of the LPL delay time Tlpl and the HPL delay time Thpl. Incidentally, since the flow amounts of the EGR gases are estimated in this manner, the condition that the amount of change of fuel be greater than the pre-set predetermined criterion amount a corresponds to an EGR gas amount estimation condition in the invention. In addition, the LPL delay time corresponds to a low-pressure EGR gas recirculation duration, and the HPL delay time corresponds to a high-pressure EGR gas recirculation duration in the invention.

Figure 13:
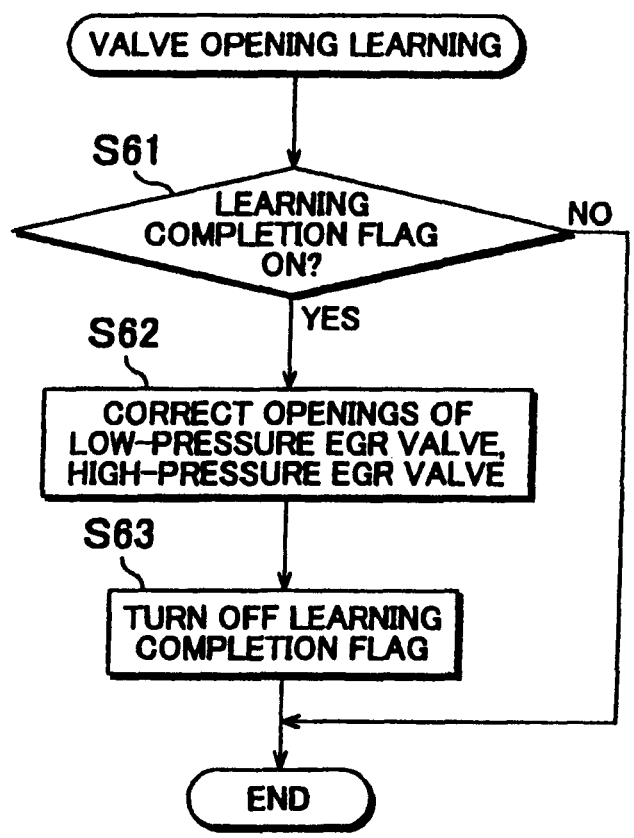
FIG. 13 is a flowchart showing an opening degree learning routine in accordance with the third embodiment.

The flow amount Glpl of the first EGR gas and the flow amount Ghpl of the second EGR gas calculated in the routine shown in FIGS. 12A and 12B and the opening degrees of the EGR valves 23, 24 at the time of calculation of the flow amounts Glpl, Ghpl are used in correcting the correspondence relations between the opening degrees of the EGR valves 23, 24 and the flow amounts of gas passing therethrough. FIG. 13 shows an opening degree learning routine that the ECU 30 repeatedly executes at every predetermined cycle period during operation of the engine 1 in order to correct the correspondence relations between the opening degrees of the EGR valves 23, 24 and the flow amounts of gas passing through the valves. By executing this routine, the ECU 30 functions as learning means in the invention.

Figure 14:
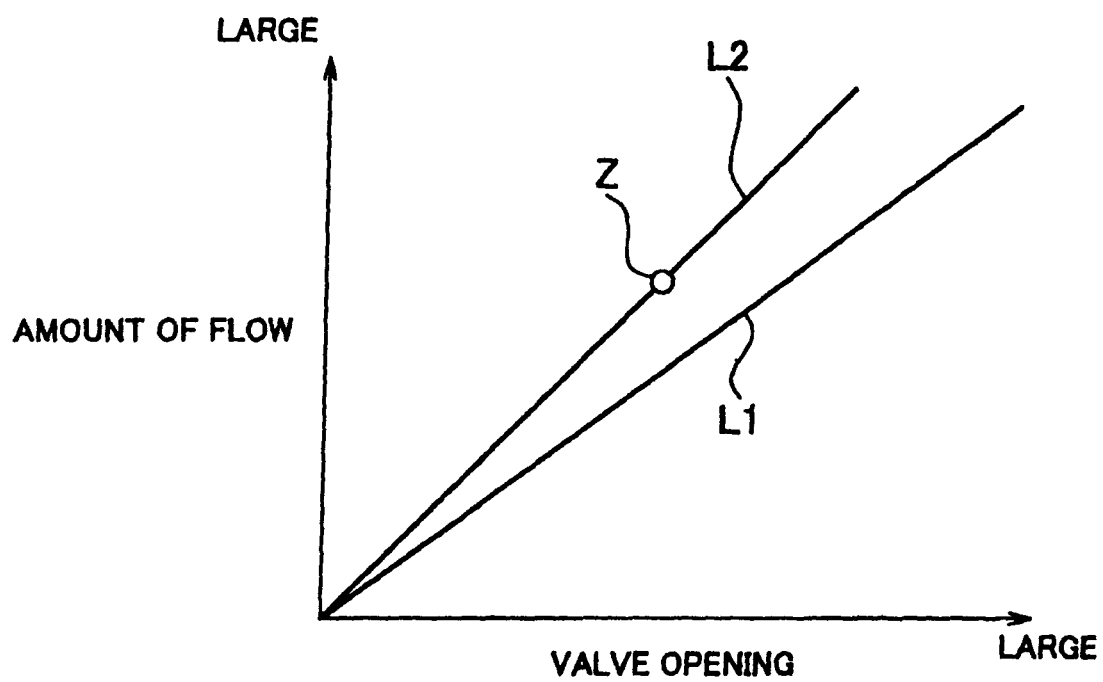
FIG. 14 is a diagram showing examples of the correspondence relation between the degree of opening of the low-pressure EGR valve and the flow amount of gas passing through the low-pressure EGR passage.

In the routine show in FIG. 13, the ECU 30 firstly determines whether or not a learning completion flag is on in step S61. If it is determined that the learning completion flag is off, the present cycle of the routine is ended. On the other hand, if it is determined that the learning completion flag is on, the process proceeds to step S62, in which the ECU 30 corrects the correspondence relations between the opening degree's of the EGR valves 23, 24 and the flow amounts of gas passing through the valves. This correction is performed on the basis of a difference between the flow amount of the first EGR gas found on the basis of the pre-correction correspondence relation and the flow amount Glpl of the first EGR gas calculated from the delay times Tlpl, Thpl. FIG. 14 shows an example of the correspondence relation between the opening degree of the low-pressure EGR valve 23 and the flow amount of gas passing through the low-pressure EGR valve 23. Besides, line L1 in FIG. 14 shows an example of a pre-correction correspondence relation. This correspondence relation is stored as a map in the RAM of the ECU 30. Therefore, the ECU 30 corresponds to storage means in the invention. If the correspondence relation between the flow amount Glpl of the first EGR gas calculated in the routine shown in FIGS. 12A and 12B and the opening degree of the valve at the time of calculation of the flow amount is a point Z in FIG. 14, the correspondence relation between the opening degree of the low-pressure EGR valve 23 and the flow amount of gas passing through the valve is corrected as shown by line L2 in FIG. 14. It suffices that the correspondence relation regarding the high-pressure EGR valve 24 be also corrected in the same manner.

In addition, the correction method is not limited to the foregoing method. Hereinafter, other correction methods will be described. For example, in the case where the high-pressure EGR valve 24 is controlled by a feedback control and the low-pressure EGR valve 23 is controlled by an open-loop control based on the rotation speed and the load of the engine 1, the correction of only the opening degree of the low-pressure EGR valve 23 is permissible. In that case, the mixture ratio between the flow amount of the first EGR gas and the flow amount of the second EGR gas is set on the basis of the operation state of the engine 1, and the target flow amount of the first EGR gas is set so as to achieve the set mixture ratio. Furthermore, the target opening degree P of the low-pressure EGR valve 23 is set so that the flow amount of the first EGR gas is adjusted to the target flow amount. Then, using the flow amount Glpl of the first EGR gas and the flow amount Ghpl of the second EGR gas calculated, the mixture ratio Mc is calculated (hereinafter, sometimes referred to as the calculated mixture ratio). The target opening degree is then corrected on the basis of a difference between the calculated mixture ratio Mc and the mixture ratio set by the ECU 30 (hereinafter, sometimes referred to as "the target mixture ratio") M. In this case, for example, a correction amount ΔP is found by multiplying by a conversion factor X the difference between the calculated mixture ratio Mc and the target mixture ratio M as shown in the following equation (31).

[Mathematical Expression 31]

$$\Delta P = X \cdot (M - M_C) \quad (31)$$

Then, the value obtained by adding the correction amount ΔP and the pre-correction target opening degree P is set as a new target opening degree, that is, a post-correction target opening degree P, as shown in the equation (32).

[Mathematical Expression 32]

$$P \leftarrow P + \Delta P \quad (32)$$

In the case where the target opening degree P is set in this manner, the correction amount ΔP can be converged by repeatedly performing the correction every time the flow amount Glpl of the first EGR gas and the flow amount Ghpl of the second EGR gas are calculated. Therefore, the first EGR gas can be adjusted with good accuracy.

Referring back to FIG. 13, in step S63, the ECU 30 switches the learning completion flag off. After that, the present cycle of the routine is ended.

Thus, since the correspondence relation between the opening degrees of the low-pressure EGR valve 23 and the high-pressure EGR valve 24 and the flow amounts of gas passing through the valves can be corrected by executing the opening degree learning routine shown in FIG. 13, the flow amount of the first EGR gas and the flow amount of the second EGR gas can be controlled with good accuracy. Besides, since the flow amount of exhaust gas that flows into the turbine 8b can be stabilized by accurately and stably controlling the flow amount of the second EGR gas, the driveability can be improved. In the case where the correction is performed using the mixture ratio between the flow amount of the first EGR gas and the flow amount of the second EGR gas, the mixture ratio can be stabilized. As is apparent from FIG. 9, the temperature of the second EGR gas is higher than the temperature of the first EGR gas. Therefore, by controlling the mixture ratio with good accuracy, the temperature of intake gas can be accurately controlled to a targeted temperature. In this case, the variations in the intake gas temperature are restrained, so that the exhaust emission can be improved.

In addition, in the case where the target temperature of the intake gas in the intake manifold 51 is set on the basis of the operation state of the engine 1, and the flow amount of the first EGR gas and the flow amount of the second EGR gas are controlled on the basis of the target temperature of the intake gas, the opening degree of the low-pressure EGR valve 23 may also be corrected on the basis of the temperature of the intake gas in the intake manifold 51 instead of the mixture ratio. The intake-air temperature tim in the intake manifold 51 can be calculated on the basis of the calculated flow amount Glpl of the first EGR gas and the flow amount Ghpl of the second EGR gas as well as the fresh-air temperature tafm, the first EGR gas temperature tlpl, and the second EGR gas temperature thpl as shown in the equation (33).

[Mathematical Expression 33]

$$tim = \frac{t_{afm} \times G_{afm} + t_{lpl} \times Glpl + t_{hpl} \times Ghpl}{G_{afm} + Glpl + Ghpl} \quad (33)$$

Since the fresh-air temperature tafm, the first-EGR gas temperature tlpl and the second-EGR gas temperature thpl can easily be acquired by a sensor or a well-known estimation method, the intake-air temperature tim in the intake manifold 51 can easily be calculated from the equation (33). Then, on the basis of a difference between the calculated intake-air temperature tim and the target temperature, the opening degree of the low-pressure EGR valve 23 is corrected similarly to the foregoing method. By correcting the opening degree of the low-pressure EGR valve 23 on the basis of the intake-air temperature in this manner, the intake-air temperature in the intake manifold 51 can be further accurately controlled, so that the exhaust emissions can be further improved.

The invention is not limited to the foregoing embodiments, but can also be carried out in various other embodiments. For example, the invention is not limited to diesel engines, but may also be applied to various kinds of internal combustion engines that use gasoline or other types of fuels. Besides, the number of cylinders of the internal combustion engine to which the invention is applied is not limited to four, and the type of arrangement thereof is not limited to an in-line type, either. For example, the invention may also be applied to internal combustion engines having, for example, 3, 6, 8, 10 or 12 cylinders, and may also be applied to V-type internal combustion engines, too. Furthermore, the invention is not limited to in-cylinder direct-injection type internal combustion engines in which fuel is injected directly into the cylinders, but may also be applied to so-called port-injection type internal combustion engines in which fuel is injected to intake ports.

The invention claimed is:

1. An exhaust gas recirculation device of an internal combustion engine, comprising:
   a low-pressure EGR passage that connects an exhaust passage and an intake passage;
   a high-pressure EGR passage that connects the exhaust passage upstream of a position of connection of the exhaust passage with the low-pressure EGR passage and the intake passage downstream of a position of connection of the intake passage with the low-pressure EGR passage;
   a low-pressure EGR valve that adjusts flow amount of exhaust gas that flows in the low-pressure EGR passage;
   a high-pressure EGR valve that adjusts the flow amount of exhaust gas that flows in the high-pressure EGR passage;
   an oxygen concentration acquisition device that is disposed in the intake passage downstream of a position of connection of the intake passage with the high-pressure EGR passage or in the exhaust passage upstream of the position of the connection of the exhaust passage with the low-pressure EGR passage, the oxygen concentration acquisition device acquires oxygen concentration of the gas flowing in the passage in which the oxygen concentration acquisition device is disposed;
   an EGR gas amount estimation device that, if a predetermined EGR gas amount estimation condition is satisfied, estimates the flow amount of exhaust gas flowing in at least one of the low-pressure EGR passage and the high-pressure EGR passage that is set as at least one estimation-object EGR passage, based on the oxygen concentration acquired by the oxygen concentration acquisition device at a timing at which the exhaust gas recirculated into the intake passage via the at least one estimation-object EGR passage reaches the oxygen concentration acquisition device;
   a storage device that stores a correspondence relation between the flow amount of the exhaust gas recirculated into the intake passage via the estimation-object EGR passage and opening degree of an EGR valve that is provided in the estimation-object EGR passage; and
   a learning device that amends the correspondence relation stored in the storage device based on a difference between the flow amount of exhaust gas estimated by the EGR gas amount estimation device and a target flow amount of exhaust gas that is to be recirculated via the estimation-object EGR passage when the predetermined EGR gas amount estimation condition is satisfied;
   wherein the internal combustion engine further includes a first throttle valve that is provided in the intake passage upstream of the position of the connection with the low-pressure EGR passage and that is capable of adjusting an intake amount, and a second throttle valve that is provided in the intake passage downstream of the position of the connection with the low-pressure EGR passage and upstream of the position of the connection with the high-pressure EGR passage and that is capable of adjusting the intake amount; the internal combustion engine is an object of application of a fuel-cut control in which supply of fuel to the internal combustion engine is stopped if a predetermined fuel-cut condition is satisfied; the predetermined EGR gas amount estimation condition is the predetermined fuel-cut condition; the low-pressure EGR passage and the high-pressure EGR passage are set as the estimation-object EGR passage; the oxygen concentration acquisition device is disposed in the exhaust passage upstream of the position of the connection with the low-pressure EGR passage; the EGR as amount estimation device, if the predetermined EGR gas amount estimation condition is satisfied, firstly fully closes the low-pressure EGR valve and the high-pressure EGR valve, and fully opens the first throttle valve and the second throttle valve, and then retains, as a first oxygen concentration, the oxygen concentration that is acquired by the oxygen concentration acquisition device at a time point at which a gas existing in the intake passage downstream of the position of the connection with the high-pressure EGR passage when the predetermined EGR gas amount estimation condition is satisfied reaches the oxygen concentration acquisition device, and retains, as a second oxygen concentration, the oxygen concentration that is acquired by the oxygen concentration acquisition device at a time point at which a gas existing in the intake passage upstream of the position of the connection with the high-pressure EGR passage and downstream of the position of the connection with the low-pressure EGR passage when the predetermined EGR gas amount estimation condition is satisfied reaches the oxygen concentration acquisition device, and estimates the flow amount of exhaust gas recirculated via the low-pressure EGR passage and the flow amount of exhaust gas recirculated via the high-pressure EGR passage when the predetermined EGR gas amount estimation condition is satisfied, based on the first oxygen concentration and the second oxygen concentration.

2. The exhaust gas recirculation device according to claim 1, wherein the EGR gas amount estimation device fully closes the second throttle valve at a time point at which the gas existing in the intake passage downstream of the position of the connection with the high-pressure EGR passage when the predetermined EGR gas amount estimation condition is satisfied reaches the oxygen concentration acquisition device, and fully opens the second throttle valve after the first oxygen concentration is acquired.

3. The exhaust gas recirculation device according to claim 1, wherein the oxygen concentration acquisition device is disposed in the exhaust passage upstream of the position of the connection with the high-pressure EGR passage, and wherein the EGR gas amount estimation device fully closes the second throttle valve and fully opens the high-pressure EGR valve at a time point at which the gas existing in the intake passage upstream of the position of the connection with the high-pressure EGR passage and downstream of the position of the connection with the low-pressure EGR passage when the EGR gas amount estimation condition is satisfied reaches the oxygen concentration acquisition device, and then fully opens the second throttle valve and fully closes the high-pressure EGR valve after the second oxygen concentration is acquired.

4. An exhaust gas recirculation method of an internal combustion engine, the internal combustion engine including: a low-pressure EGR passage that connects an exhaust passage and an intake passage; a high-pressure EGR passage that connects the exhaust passage upstream of a position of connection of the exhaust passage with the low-pressure EGR passage and the intake passage downstream of a position of connection of the intake passage with the low-pressure EGR passage; a low-pressure EGR valve that adjusts flow amount of exhaust gas that flows in the low-pressure EGR passage; a high-pressure EGR valve that adjusts the flow amount of exhaust gas that flows in the high-pressure EGR passage; and oxygen concentration acquisition device disposed in the intake passage downstream of a position of connection of the intake passage with the high-pressure EGR passage or in the exhaust passage upstream of the position of the connection of the exhaust passage with the low-pressure EGR passage, the oxygen concentration acquisition device acquiring oxygen concentration of the gas flowing in the passage in which the oxygen concentration acquisition device is disposed, the exhaust gas recirculation method comprising estimating, if a predetermined EGR gas amount estimation condition is satisfied, the flow amount of exhaust gas flowing in at least one of the low-pressure EGR passage and the high-pressure EGR passage that is set as at least one estimation-object EGR passage, based on the oxygen concentration acquired by the oxygen concentration acquisition device at a timing at which the exhaust gas recirculated into the intake passage via the at least one estimation-object EGR passage reaches the oxygen concentration acquisition device;

storing, via a storage device, a correspondence relation between the flow amount of the exhaust gas recirculated into the intake passage via the estimation-object EGR passage and opening degree of an EGR valve that is provided in the estimation-object EGR passage; and amending, via a learning device, the correspondence relation stored in the storage device based on a difference between the flow amount of exhaust gas estimated in the estimating and a target flow amount of exhaust gas that is to be recirculated via the estimation-object EGR passage when the predetermined EGR gas amount estimation condition is satisfied;

wherein the internal combustion engine further includes a first throttle valve that is provided in the intake passage upstream of the position of the connection with the low-pressure EGR passage and that is capable of adjusting an intake amount, and a second throttle valve that is provided in the intake passage downstream of the position of the connection with the low-pressure EGR passage and upstream of the position of the connection with the high-pressure EGR passage and that is capable of adjusting the intake amount; the internal combustion engine is an object of application of a fuel-cut control in which supply of fuel to the internal combustion engine is stopped if a predetermined fuel-cut condition is satisfied; the predetermined EGR gas amount estimation condition is the predetermined fuel-cut condition; the low-pressure EGR passage and the high-pressure EGR passage are set as the estimation-object EGR passage; the oxygen concentration acquisition device is disposed in the exhaust passage upstream of the position of the connection with the low-pressure EGR passage;

the exhaust gas recirculation method further comprising:

firstly fully closing the low-pressure EGR valve and the high-pressure EGR valve, and fully opening the first throttle valve and the second throttle valve, via the EGR gas amount estimation device, if the predetermined EGR gas amount estimation condition is satisfied, retaining, as a first oxygen concentration, the oxygen concentration that is acquired by the oxygen concentration acquisition device at a time point at which a gas existing in the intake passage downstream of the position of the connection with the high-pressure EGR passage when the predetermined EGR gas amount estimation condition is satisfied reaches the oxygen concentration acquisition device, retaining, as a second oxygen concentration, the oxygen concentration that is acquired by the oxygen concentration acquisition device at a time point at which a gas existing in the intake passage upstream of the position of the connection with the high-pressure EGR passage and downstream of the position of the connection with the low-pressure EGR passage when the predetermined EGR gas amount estimation condition is satisfied reaches the oxygen concentration acquisition device, and estimating the flow amount of exhaust gas recirculated via the low-pressure EGR passage and the flow amount of exhaust gas recirculated via the high-pressure EGR passage when the predetermined EGR gas amount estimation condition is satisfied, based on the first oxygen concentration and the second oxygen concentration.

5. An exhaust gas recirculation device of an internal combustion engine, comprising:

a low-pressure EGR passage that connects an exhaust passage and an intake passage;

a high-pressure EGR passage that connects the exhaust passage upstream of a position of connection of the exhaust passage with the low-pressure EGR passage and the intake passage downstream of a position of connection of the intake passage with the low-pressure EGR passage;

a low-pressure EGR valve that adjusts flow amount of exhaust gas that flows in the low-pressure EGR passage;

a high-pressure EGR valve that adjusts the flow amount of exhaust gas that flows in the high-pressure EGR passage;

an oxygen concentration acquisition device that is disposed in the intake passage downstream of a position of connection of the intake passage with the high-pressure EGR passage or in the exhaust passage upstream of the position of the connection of the exhaust passage with the low-pressure EGR passage, the oxygen concentration acquisition device acquires oxygen concentration of the gas flowing in the passage in which the oxygen concentration acquisition device is disposed;

an EGR gas amount estimation device that, if a predetermined EGR gas amount estimation condition is satisfied, estimates the flow amount of exhaust gas flowing in at least one of the low-pressure EGR passage and the high-pressure EGR passage that is set as at least one estimation-object EGR passage, based on the oxygen concentration acquired by the oxygen concentration acquisition device at a timing at which the exhaust gas recirculated into the intake passage via the at least one estimation-object EGR passage reaches the oxygen concentration acquisition device;

a storage device that stores a correspondence relation between the flow amount of the exhaust gas recirculated into the intake passage via the estimation-object EGR passage and opening degree of an EGR valve that is provided in the estimation-object EGR passage; and a learning device that amends the correspondence relation stored in the storage device based on a difference between the flow amount of exhaust gas estimated by the EGR gas amount estimation device and a target flow amount of exhaust gas that is to be recirculated via the estimation-object EGR passage when the predetermined EGR gas amount estimation condition is satisfied;

wherein the low-pressure EGR passage is set as the estimation-object EGR passage; the oxygen concentration acquisition device is disposed in the intake passage downstream of the position of the connection with the high-pressure EGR passage; it is determined that the EGR gas amount estimation condition is satisfied when an amount of change in amount of fuel supplied to the internal combustion engine, if the amount of fuel changes, is greater than or equal to a pre-set predetermined amount; and if the predetermined EGR gas amount estimation condition is satisfied, the EGR gas amount estimation device acquires, as a high-pressure EGR gas recirculation duration, a period from the time of satisfaction of the predetermined EGR gas amount estimation condition till a time at which the amount of change in the oxygen concentration acquired by the oxygen concentration acquisition device subsequently to the satisfaction of the predetermined EGR gas amount estimation condition, if the oxygen concentration changes, first exceeds a pre-set criterion value, on a condition that opening degree of the high-pressure EGR valve and the opening degree of the low-pressure EGR valve be maintained, and acquires, as a low-pressure EGR gas recirculation duration, a period from the time of satisfaction of the predetermined EGR gas amount estimation condition till a time at which the amount of change in the oxygen concentration acquired by the oxygen concentration acquisition device subsequently to the satisfaction of the predetermined EGR gas amount estimation, if the oxygen concentration changes, exceeds the criterion value for a second time, and then estimates the flow amount of exhaust gas that is recirculated via the low-pressure EGR passage based on the high-pressure EGR gas recirculation duration and the low-pressure EGR gas recirculation duration.

6. The exhaust gas recirculation device according to claim 5, wherein the EGR gas amount estimation device stops estimating the flow amount of exhaust gas recirculated via the low-pressure EGR passage if the amount of fuel supplied to the internal combustion engine fluctuates beyond a pre-set permissible range during a period from the satisfaction of the EGR gas amount estimation condition until the low-pressure EGR gas recirculation duration is acquired.

7. An exhaust gas recirculation method of an internal combustion engine, the internal combustion engine including: a low-pressure EGR passage that connects an exhaust passage and an intake passage; a high-pressure EGR passage that connects the exhaust passage upstream of a position of connection of the exhaust passage with the low-pressure EGR passage and the intake passage downstream of a position of connection of the intake passage with the low-pressure EGR passage; a low-pressure EGR valve that adjusts flow amount of exhaust gas that flows in the low-pressure EGR passage; a high-pressure EGR valve that adjusts the flow amount of exhaust gas that flows in the high-pressure EGR passage; and oxygen concentration acquisition device disposed in the intake passage downstream of a position of connection of the intake passage with the high-pressure EGR passage or in the exhaust passage upstream of the position of the connection of the exhaust passage with the low-pressure EGR passage, the oxygen concentration acquisition device acquiring oxygen concentration of the gas flowing in the passage in which the oxygen concentration acquisition device is disposed, the exhaust gas recirculation method comprising estimating, if a predetermined EGR gas amount estimation condition is satisfied, the flow amount of exhaust gas flowing in at least one of the low-pressure EGR passage and the high-pressure EGR passage that is set as at least one estimation-object EGR passage, based on the oxygen concentration acquired by the oxygen concentration acquisition device at a timing at which the exhaust gas recirculated into the intake passage via the at least one estimation-object EGR passage reaches the oxygen concentration acquisition device;

storing, via a storage device, a correspondence relation between the flow amount of the exhaust gas recirculated into the intake passage via the estimation-object EGR passage and opening degree of an EGR valve that is provided in the estimation-object EGR passage; and amending, via a learning device, the correspondence relation stored in the storage device based on a difference between the flow amount of exhaust gas estimated in the estimating and a target flow amount of exhaust gas that is to be recirculated via the estimation-object EGR passage when the predetermined EGR gas amount estimation condition is satisfied;

wherein the low-pressure EGR passage is set as the estimation-object EGR passage; the oxygen concentration acquisition device is disposed in the intake passage downstream of the position of the connection with the high-pressure EGR passage; and the exhaust gas recirculation method further comprising:

determining that the EGR gas amount estimation condition is satisfied when an amount of change in amount of fuel supplied to the internal combustion engine, if the amount of fuel changes, is greater than or equal to a pre-set predetermined amount;

acquiring, via the EGR gas amount estimation device, if the predetermined EGR gas amount estimation condition is satisfied, as a high-pressure EGR gas recirculation duration, a period from the time of satisfaction of the predetermined EGR gas amount estimation condition till a time at which the amount of change in the oxygen concentration acquired by the oxygen concentration acquisition device subsequently to the satisfaction of the predetermined EGR gas amount estimation condition, if the oxygen concentration changes, first exceeds a pre-set criterion value, on a condition that opening degree of the high-pressure EGR valve and the opening degree of the low-pressure EGR valve be maintained, acquiring, as a low-pressure EGR gas recirculation duration, a period from the time of satisfaction of the predetermined EGR gas amount estimation condition till a time at which the amount of change in the oxygen concentration acquired by the oxygen concentration acquisition device subsequently to the satisfaction of the predetermined EGR gas amount estimation, if the oxygen concentration changes, exceeds the criterion value for a second time, and estimating the flow amount of exhaust gas that is recirculated via the low-pressure EGR passage based on the high-pressure EGR gas recirculation duration and the low-pressure EGR gas recirculation duration.

* * * * *